United States Patent
Kim et al.

(10) Patent No.: US 10,819,844 B2
(45) Date of Patent: Oct. 27, 2020

(54) INTELLIGENT ELECTRONIC DEVICE AND MODE SETTING METHOD

(71) Applicant: LG ELECTRONICS INC., Seoul (KR)

(72) Inventors: Taehyun Kim, Seoul (KR); Jichan Maeng, Seoul (KR); Wonho Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/661,646

(22) Filed: Oct. 23, 2019

(65) Prior Publication Data

US 2020/0059551 A1    Feb. 20, 2020

(30) Foreign Application Priority Data

Aug. 15, 2019    (KR) .......... 10-2019-0099971

(51) Int. Cl.
  *H04M 3/00* (2006.01)
  *H04M 1/725* (2006.01)
  *G06N 3/08* (2006.01)

(52) U.S. Cl.
  CPC .......... *H04M 1/72577* (2013.01); *G06N 3/08* (2013.01); *H04M 1/72569* (2013.01); *H04M 1/72572* (2013.01); *H04M 1/72597* (2013.01)

(58) Field of Classification Search
  CPC ....... H04W 4/80; H04W 4/023; H04W 4/029; H04W 4/10; H04W 68/005; H04W 76/15; H04W 84/042; H04W 88/04; H04W 8/005; H04W 8/245

USPC ...... 455/41.2, 419, 426.1, 413, 450, 426.31, 455/566, 456.2, 550.1, 456.3

See application file for complete search history.

(56) References Cited

U.S. PATENT DOCUMENTS

| | | | |
|---|---|---|---|
| 2004/0174570 A1* | 9/2004 | Plunkett | B41J 2/04505 358/3.13 |
| 2005/0210179 A1* | 9/2005 | Walmsley | B41J 2/04505 711/3 |
| 2006/0088018 A1* | 4/2006 | Black | G01D 21/00 370/338 |
| 2014/0080415 A1* | 3/2014 | Black | H04W 80/00 455/41.2 |
| 2019/0364492 A1* | 11/2019 | Azizi | H04W 24/08 |

* cited by examiner

*Primary Examiner* — Joseph Arevalo
(74) *Attorney, Agent, or Firm* — Birch, Stewart, Kolasch & Birch, LLP

(57) ABSTRACT

A method of setting a mode of an intelligent electronic device is disclosed. The method includes collecting a plurality of sensing information through a plurality of sensors, obtaining surrounding situation information based on the plurality of collected sensing information, extracting a feature value from the obtained surrounding situation information and determining a surrounding environment based on the extracted feature value, and selecting a disturbance interruption mode corresponding to the determined result. The intelligent robot device may be associated with an artificial intelligence module, an unmanned aerial vehicle (UAV), a robot, an augmented reality (AR) device, a virtual reality (VR) device, devices related to 5G services, and the like.

20 Claims, 12 Drawing Sheets

INTELLIGENT ELECTRONIC DEVICE AND MODE SETTING METHOD

CROSS REFERENCE TO RELATED APPLICATIONS

This application claims the priority benefit of Korean Patent Application No. 10-2019-0099971 filed on Aug. 15, 2019, which is incorporated herein by reference for all purposes as if fully set forth herein.

BACKGROUND OF THE INVENTION

Field of the Invention

The present disclosure relates to an intelligent electronic device and a mode setting method, and more particularly, to an electronic device and a mode setting method capable of sensing an illumination sensor value and/or a gyro sensor value according to a specific situation or a surrounding situation, learning the sensed illumination sensor value and/or gyro sensor value, and automatically setting or releasing a disturbance interruption mode based on the learned result.

Discussion of the Related Art

Recently, due to the development of information and communication technology, diversification and functions of smartphones have been much improved. Further, more than one smartphone per person has been widely used.

With the spread of smartphones, there is a need for appropriately adjusting notifications, i.e., a volume, screen brightness, vibration, etc. of the smartphone in a specific situation.

However, it is very cumbersome for a user to change a notification every time in a specific situation, and due to the user's error, the user may not be able to change a notification.

That is, in a specific situation, a situation has occurred in which setting or release of a disturbance interruption mode is required through a notification setting corresponding to the specific situation, and there is inconvenience that the user should change setting or release of a disturbance interruption mode every time in the specific situation in order to set or release the disturbance interruption mode appropriate to the situation. Further, there has been a problem that the user may not change setting or release of the disturbance interruption mode due to a mistake or forgetfulness.

SUMMARY OF THE INVENTION

An object of the present disclosure is to address the above-described and other needs and/or problems.

Another object of the present disclosure is to provide an intelligent electronic device and a mode setting method capable of recognizing a surrounding situation through various sensors installed in the intelligent electronic device and automatically setting or releasing a disturbance interruption mode based on the recognized result.

In one aspect, there is provided a method of setting a mode of an intelligent electronic device, the method comprising collecting a plurality of sensing information through a plurality of sensors; obtaining surrounding situation information based on the plurality of collected sensing information; extracting a feature value from the obtained surrounding situation information and determining a surrounding environment based on the extracted feature value; and selecting a disturbance interruption mode corresponding to the determined result.

The disturbance interruption mode may control at least one of a sound related setting, a screen brightness related setting, a vibration related setting, and a screen motion related setting.

The determining of a surrounding environment may comprise extracting feature values from the sensing information obtained through at least one sensor; and inputting the feature values to an artificial neural network (ANN) classifier trained to distinguish whether the surrounding environment is a specific location, and determining the specific location from an output of the artificial neural network, wherein the feature values are values that can distinguish whether the surrounding environment is the specific location.

The determining of a surrounding environment may further comprise storing the obtained surrounding situation information.

The collecting of a plurality of sensing information may comprise randomly collecting at least one of sensing ambient brightness to collect illumination information, sensing ambient sound to collect sound information, and sensing a moving distance to collect moving distance information.

The method may further comprise receiving, from a network, downlink control information (DCI) used for scheduling transmission of the sensing information obtained by the plurality of sensors, wherein the sensing information may be transmitted to the network based on the DCI.

The method may further comprise performing an initial access procedure with the network based on a synchronization signal block (SSB). The sensing information may be transmitted to the network through a Physical Uplink Shared Channel (PUSCH), and a demodulation reference signal (DM-RS) of the SSB and the PUSCH may be quasi co location (QCL) for QCL kind D.

The method may further comprise controlling a communication unit to transmit the sensing information to an AI processor included in the network; and controlling the communication unit to receive AI processed information from the AI processor. The AI processed information may be information that determines whether the surrounding environment is the specific location.

In another aspect, there is provided an intelligent electronic device comprising a sensor comprising a plurality of sensors; a processor for controlling to obtain surrounding situation information based on a plurality of sensing information obtained by the sensor to determine a surrounding environment, and to select a disturbance interruption mode corresponding to the determined result, and to change to the selected disturbance interruption mode; and a memory comprising a program executable by the processor.

The disturbance interruption mode may control at least one of a sound related setting, a screen brightness related setting, a vibration related setting, and a screen motion related setting.

The processor may extract feature values from the sensing information obtained through at least one sensor, inputs the feature values to an artificial neural network (ANN) classifier trained to distinguish whether the surrounding environment is a specific location, and determine a specific location from an output of the artificial neural network. The feature values may be values that can distinguish whether the surrounding environment is the specific location.

The processor may control to store the obtained surrounding situation information at the memory.

The processor may control the sensor to randomly sense at least one of illumination information that senses ambient brightness, sound information that senses ambient sound, and moving distance information that senses a moving distance.

The intelligent electronic device may further comprise a communication unit. The processor may control to receive, from a network, downlink control information (DCI) used for scheduling transmission of the sensing information obtained from the plurality of sensors through the communication unit. The sensing information may be transmitted to the network based on the DCI.

The processor may perform an initial access procedure with the network based on a synchronization signal block (SSB) through the communication unit. The sensing information may be transmitted to the network through the PUSCH, and a DM-RS of the SSB and the PUSCH may be QCL for QCL kind D.

The processor may control the communication unit to transmit the sensing information to the AI processor included in the network through the communication unit, and controls the communication unit to receive AI processed information from the AI processor. The AI processed information may be information that determines whether the surrounding environment is the specific location.

Effects of an intelligent electronic device and a mode setting method according to embodiments of the disclosure are described as follows.

The present disclosure can recognize a surrounding situation through various sensors installed in an intelligent electronic device and automatically set or cancel a disturbance interruption mode based on a recognized result, thereby improving a user's convenience.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompany drawings, which are included to provide a further understanding of the present disclosure and are incorporated on and constitute a part of the present specification illustrate embodiments of the present disclosure and together with the description serve to explain the principles of the present disclosure.

DETAILED DESCRIPTION OF THE EMBODIMENTS

Figure 1:
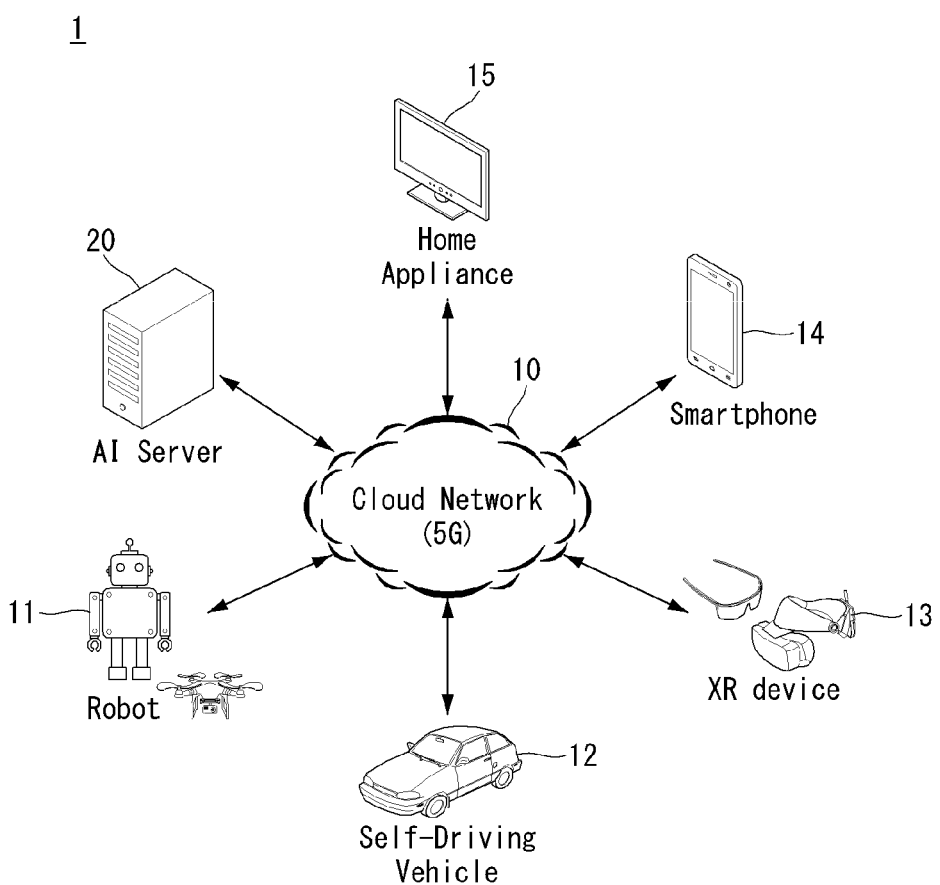
FIG. 1 is a conceptual diagram illustrating an embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

Three major requirement areas of 5G include (1) an enhanced mobile broadband (eMBB) area, (2) a massive machine type communication (mMTC) area, and (3) ultra-reliable and low latency communications (URLLC) area.

Some use cases may require multiple areas for optimization, and other use cases may be focused to only one key performance indicator (KPI). 5G supports these various use cases in a flexible and reliable manner.

The EMBB enables far beyond basic mobile Internet access and covers media and entertainment applications in rich interactive work, cloud or augmented reality. Data is one of key dynamic power of 5G, and in a 5G era, a dedicated voice service may not be seen for the first time. In 5G, a voice is expected to be treated as an application program using data connection simply provided by a communication system. Main reasons for an increased traffic volume are increase in content size and increase in the number of applications requiring a high data transmission rate. Streaming services (audio and video), interactive video, and mobile Internet connections will be used more widely as more devices connect to Internet. These many application programs require always-on connectivity in order to push real-time information and notifications to a user. Cloud storage and applications are growing rapidly in mobile communication platforms, which may be applied to both work and entertainment. Cloud storage is a special use case that drives growth of uplink data transmission rates. 5G is also used for remote tasks in cloud and requires much lower end-to-end delays so as to maintain excellent user experience when tactile interfaces are used. Entertainment, for example, cloud gaming and video streaming is another key factor in increasing the need for mobile broadband capabilities. Entertainment is essential in smartphones and tablets at anywhere including in high mobility environments such as trains, cars and airplanes. Another use case is augmented reality and information search for entertainment. Here, augmented reality requires very low latency and instantaneous amount of data.

Further, one of most anticipated 5G use cases relates to a function, i.e., mMTC that can smoothly connect embedded sensors in all fields. By 2020 year, potential IoT devices are expected to reach 20.4 billion. Industrial IoT is one of areas in which 5G plays a major role in enabling smart cities, asset tracking, smart utilities, and agriculture and security infrastructure.

URLLC includes new services to transform an industry through ultra-reliable/available low latency links, such as remote control of major infrastructure and self-driving vehicles. A level of reliability and latency is essential for smart grid control, industrial automation, robotics, drone control, and coordination.

Hereinafter, a number of use cases are described in more detail.

5G may complement fiber-to-the-home (FTTH) and cable-based broadband (or DOCSIS) as a means of providing streams that are rated at hundreds of megabits per second to gigabits per second. Such a high speed is required to deliver televisions with a resolution of 4K or more (6K, 8K, and more) as well as virtual reality and augmented reality. Virtual Reality (VR) and Augmented Reality (AR) applications include nearly immersive sporting events. A specific application program may require a special network setting. For example, for VR games, in order to minimize latency, game companies may need to integrate core servers with an edge network server of a network operator.

An automotive is expected to become important new dynamic power for 5G together with many use cases for mobile communication to vehicles. For example, entertainment for passengers requires simultaneous high capacity and high mobility mobile broadband. This is because future users continue to expect high quality connections regardless of a position and speed thereof. Another use case of an automotive sector is an augmented reality dashboard. This identifies objects in the dark above what a driver views through a front window and overlays and displays information that notifies the driver about a distance and movement of the object. In the future, wireless modules enable communication between vehicles, exchange of information between a vehicle and a supporting infrastructure, and exchange of information between a vehicle and other connected devices (e.g., devices carried by pedestrians). A safety system guides alternative courses of an action to enable drivers to safer drive, thereby reducing the risk of an accident. The next step will be a remotely controlled or self-driven vehicle. This requires very reliable and very fast communication between different self-driving vehicles and between automobiles and infrastructure. In the future, self-driving vehicles will perform all driving activities and the driver will focus on traffic anomalies that the vehicle itself cannot identify. The technical requirements of self-driving vehicles require ultra-low latency and ultra-fast reliability so as to increase traffic safety to an unachievable level.

Smart cities and smart homes, referred to as smart societies, will be embedded in a high density wireless sensor network. A distributed network of intelligent sensors will identify conditions for a cost and energy-efficient maintenance of a city or a home. Similar settings may be made for each family. Temperature sensors, window and heating controllers, burglar alarms and home appliances are all connected wirelessly. These many sensors are typically low data rates, low power and low cost. However, for example, real-time HD video may be required in a specific type of device for surveillance.

Consumption and distribution of energy including a heat or a gas is highly decentralized, thereby requiring automated control of distributed sensor networks. Smart grids interconnect these sensors using digital information and communication technology so as to collect information and act accordingly. The information may include a behavior of suppliers and consumers, allowing smart grids to improve distribution of fuels such as electricity in efficiency, reliability, economics, sustainability of production, and in an automated manner. Smart grid may be viewed as another sensor network with low latency.

A health sector has many application programs that can benefit from mobile communication. The communication system may support telemedicine that provides clinical care at a far distance. This may help reduce barriers to distance and improve access to healthcare services that are not consistently available in remote rural areas. It is also used for saving lives in important care and emergency situations. A mobile communication based wireless sensor network may provide remote monitoring and sensors for parameters such as a heart rate and a blood pressure.

Wireless and mobile communication is becoming gradually important in an industrial application field. A wiring requires a highly installing and maintaining cost. Therefore, the possibility of replacing with a wireless link that can reconfigure a cable is an attractive opportunity in many industry fields. However, achieving this requires that a wireless connection operates with reliability, capacity, and delay similar to a cable and that management is simplified. Low latency and very low error probability are new requirements that need to be connected in 5G.

Logistics and freight tracking are important use cases for mobile communication that enable tracking of inventory and packages at anywhere using a position-based information system. A use case of logistics and freight tracking typically requires a low data rate, but requires reliable position information and a wide range.

The present disclosure to be described later in the present specification may be implemented by combining or changing each embodiment so as to satisfy the requirements of the above-described 5G.

FIG. 1 is a conceptual diagram illustrating an embodiment of an AI device.

Referring to FIG. 1, in an AI system, at least one of an AI server 20, a robot 11, an autonomous vehicle 12, an XR device 13, a smartphone 14, or a home appliance 15 is connected to a cloud network 10. Here, the robot 11, the autonomous vehicle 12, the XR device 13, the smartphone 14, or the home appliance 15 to which AI technology is applied may be referred to as AI devices 11 to 15.

The cloud network 10 may mean a network that configures part of a cloud computing infrastructure or that exists inside a cloud computing infrastructure. Here, the cloud network 10 may be configured using a 3G network, a 4G network, a long term evolution (LTE) network, or a 5G network.

That is, each device 11 to 15 and 20 constituting the AI system may be connected to each other through the cloud network 10. In particular, each of the devices 11 to 15 and 20 may communicate with each other through a base station, but may directly communicate with each other without passing through a base station.

The AI server 20 may include a server that performs AI processing and a server that performs operations on big data.

The AI server 20 may be connected to at least one of the robot 11, the autonomous vehicle 12, the XR device 13, the smartphone 14, or the home appliance 15, which are AI devices constituting the AI system through the cloud network 10 and may help at least some of AI processing of the connected AI devices 11 to 15.

In this case, the AI server 20 may learn an artificial neural network according to machine learning algorithm instead of the AI devices 11 to 15 and directly store a learning model or transmit a learning model to the AI devices 11 to 15.

In this case, the AI server 20 may receive input data from the AI devices 11 to 15, infer a result value of the input data received using a learning model, and generate a response or a control command based on the inferred result value to transmit the response or the control command to the AI devices 11 and 15.

Alternatively, the AI devices 11 to 15 may directly infer a result value of the input data using a learning model and generate a response or a control command based on the inferred result value.

<AI+Robot>

AI technology is applied to the robot 11, and the robot 11 may be implemented into a guide robot, a transport robot, a cleaning robot, a wearable robot, an entertainment robot, a pet robot, an unmanned aerial robot, or the like.

The robot 11 may include a robot control module for controlling an operation, and the robot control module may mean a software module or a chip implemented in hardware.

The robot 11 may obtain status information of the robot 11 using sensor information obtained from various kinds of sensors, detect (recognize) a surrounding environment and an object, generate map data, determine a moving route and a driving plan, determine a response to a user interaction, or determine an operation.

Here, in order to determine a movement route and a driving plan, the robot 11 may use sensor information obtained from a sensor of at least one of rider, radar, and a camera.

The robot 11 may perform the above operation using a learning model configured with at least of one artificial neural network. For example, the robot 11 may recognize a surrounding environment and an object using a learning model, and determine an operation using the recognized surrounding environment information or object information. Here, the learning model may be directly learned by the robot 11 or may be learned by an external device such as the AI server 20.

In this case, by generating a result directly using a learning model, the robot 11 may perform an operation, but may transmit sensor information to an external device such as the AI server 20 and receive the generated result and perform an operation.

The robot 11 may determine a movement route and a driving plan using at least one of map data, object information detected from sensor information, or object information obtained from an external device, and control a driver to drive the robot 11 according to the determined movement route and driving plan.

The map data may include object identification information about various objects disposed in a space in which the robot 11 moves. For example, the map data may include object identification information about fixed objects such as walls and doors and movable objects such as flower pots and desks. The object identification information may include a name, a kind, a distance, and a position.

Further, by controlling the driver based on the control/interaction of a user, the robot 11 may perform an operation or may drive. In this case, the robot 11 may obtain intention information of an interaction according to the user's motion or voice utterance, and determine a response based on the obtained intention information to perform an operation.

<AI+Autonomous Vehicle>

AI technology is applied to the autonomous vehicle 12 and thus the autonomous vehicle 12 may be implemented into a mobile robot, a vehicle, an unmanned aerial vehicle, or the like.

The autonomous vehicle 12 may include an autonomous driving control module for controlling an autonomous driving function, and the autonomous driving control module may mean a software module or a chip implemented in hardware. The autonomous driving control module may be included inside the autonomous vehicle 12 as a configuration of the autonomous vehicle 12, but may be configured as a separate hardware to be connected to the outside of the autonomous vehicle 12.

The autonomous vehicle 12 may obtain status information thereof using sensor information obtained from various types of sensors, detect (recognize) a surrounding environment and object, generate map data, determine a moving route and a driving plan, or determine an operation.

Here, in order to determine a movement route and a driving plan, the autonomous vehicle 12 may use sensor information obtained from a sensor of at least one of rider, radar, and a camera, similar to the robot 11.

In particular, the autonomous vehicle 12 may recognize an environment or an object about an area in which a field of view is covered or an area of a predetermined distance or more by receiving sensor information from external devices or may directly receive recognized information from external devices.

The autonomous vehicle 12 may perform the above-described operations using a learning model configured with at least one artificial neural network. For example, the autonomous vehicle 12 may recognize a surrounding environment and an object using a learning model, and determine a driving route using the recognized surrounding environment information or object information. Here, the learning model may be learned directly from the autonomous vehicle 12 or may be learned from an external device such as the AI server 20.

In this case, by generating a result directly using a learning model, the autonomous vehicle 12 may perform an operation, but transmit sensor information to an external device such as the AI server 20 and thus receive the generated result to perform an operation.

The autonomous vehicle 12 may determine a moving route and a driving plan using at least one of map data, object information detected from sensor information, or object information obtained from an external device, and controls the driver to drive the autonomous vehicle 12 according to the determined moving route and driving plan.

The map data may include object identification information about various objects disposed in a space (e.g., road) in which the autonomous vehicle 12 drives. For example, the map data may include object identification information about fixed objects such as street lights, rocks, buildings, and movable objects such as vehicles and pedestrians. The object identification information may include a name, a kind, a distance, a position, and the like.

Further, by controlling the driver based on a user's control/interaction, the autonomous vehicle 12 may perform an operation or may drive. In this case, the autonomous vehicle 12 may obtain intention information of an interaction according to the user's motion or voice utterance, and determine a response based on the obtained intention information to perform an operation.

<AI+XR>

AI technology is applied to the XR device 13 and thus the XR device 13 may be implemented into a head-mount display (HMD), a head-up display (HUD) installed in a vehicle, a television, a mobile phone, a smartphone, a computer, a wearable device, a home appliance, digital signage, a vehicle, a fixed robot, or a mobile robot.

The XR device 13 may analyze three-dimensional point cloud data or image data obtained through various sensors or from an external device to generate position data and attribute data of the three-dimensional points, thereby obtaining information about a surrounding space or a reality object and rendering and outputting an XR object to output. For example, the XR device 13 may output an XR object including additional information about the recognized object to correspond to the recognized object.

The XR device 13 may perform the above-described operations using a learning model configured with at least one artificial neural network. For example, the XR device 13 may recognize a real object in 3D point cloud data or image data using the learning model, and provide information corresponding to the recognized real object. Here, the learning model may be learned directly from the XR device 13 or may be learned from an external device such as the AI server 20.

In this case, by generating a result directly using a learning model, the XR device 13 may perform an operation, but transmit sensor information to an external device such as the AI server 20 and receive the generated result to perform an operation.

<AI+Robot+Autonomous Driving>

AI technology and autonomous driving technology are applied to the robot 11 and thus the robot 11 may be implemented into a guide robot, a transport robot, a cleaning robot, a wearable robot, an entertainment robot, a pet robot, an unmanned aerial robot, or the like.

The robot 11 to which AI technology and autonomous driving technology are applied may mean a robot having an autonomous driving function or a robot 11 interacting with the autonomous vehicle 12.

The robot 11 having an autonomous driving function may be collectively referred to as devices that moves by themselves according to a given moving route without a user's control or that determine and move a moving route by themselves.

In order to determine at least one of a movement route or a driving plan, the robot 11 and the autonomous vehicle 12 having an autonomous driving function may use a common sensing method. For example, the robot 11 and the autonomous vehicle 12 having the autonomous driving function may determine at least one of a movement route or a driving plan using information sensed through lidar, radar, and the camera.

While the robot 11 interacting with the autonomous vehicle 12 exists separately from the autonomous vehicle 12, the robot 11 may be linked to an autonomous driving function inside or outside the autonomous vehicle 12 or may perform an operation connected to a user who rides in the autonomous vehicle 12.

In this case, the robot 11 interacting with the autonomous vehicle 12 may obtain sensor information instead of the autonomous vehicle 12 to provide the sensor information to the autonomous vehicle 12 or may obtain sensor information and generate surrounding environment information or object information to provide the surrounding environment information or the object information to the autonomous vehicle 12, thereby controlling or assisting an autonomous driving function of the autonomous vehicle 12.

Alternatively, the robot 11 interacting with the autonomous vehicle 12 may monitor a user who rides in the autonomous vehicle 12 or may control a function of the autonomous vehicle 12 through an interaction with the user. For example, when it is determined that a driver is in a drowsy state, the robot 11 may activate an autonomous driving function of the autonomous vehicle 12 or assist the control of the driver of the autonomous vehicle 12. Here, the function of the autonomous vehicle 12 controlled by the robot 11 may include a function provided by a navigation system or an audio system provided inside the autonomous vehicle 12 as well as an autonomous driving function.

Alternatively, the robot 11 interacting with the autonomous vehicle 12 may provide information from the outside of the autonomous vehicle 12 to the autonomous vehicle 12 or assist a function of the autonomous vehicle 12. For example, the robot 11 may provide traffic information including signal information to the autonomous vehicle 12 as in a smart traffic light and interact with the autonomous vehicle 12 to automatically connect an electric charger to a charging port, as in an automatic electric charger of an electric vehicle.

<AI+Robot+XR>

AI technology and XR technology are applied to the robot 11, and the robot 11 may be implemented into a guide robot, a transport robot, a cleaning robot, a wearable robot, an entertainment robot, a pet robot, an unmanned aerial robot, a drone, or the like.

The robot 11 to which the XR technology is applied may mean a robot to be an object of control/interaction in an XR image. In this case, the robot 11 may be distinguished from the XR device 13 and be interworked with the XR device 13.

When the robot 11 to be an object of control/interaction in the XR image obtains sensor information from sensors including a camera, the robot 11 or the XR device 13 generates an XR image based on the sensor information, and the XR device 13 may output the generated XR image. The robot 11 may operate based on a control signal input through the XR device 13 or a user interaction.

For example, the user may check an XR image corresponding to a viewpoint of the robot 11 remotely linked through an external device such as the XR device 13, and adjust an autonomous driving route of the robot 11 through an interaction, control an operation or driving of the robot 11, or check information of a surrounding object.

<AI+Autonomous Vehicle+XR>

AI technology and XR technology are applied to the autonomous vehicle 12, and the autonomous vehicle 12 may be implemented into a mobile robot, a vehicle, an unmanned aerial vehicle, and the like.

The autonomous vehicle 12 to which XR technology is applied may mean an autonomous vehicle having a means for providing an XR image or an autonomous vehicle to be an object of control/interaction in the XR image. In particular, the autonomous vehicle 12 to be an object of control/interaction in the XR image may be distinguished from the XR device 13 and be interworked with the XR device 13.

The autonomous vehicle 12 having a means for providing an XR image may obtain sensor information from sensors including a camera, and output an XR image generated based on the obtained sensor information. For example, by having an HUD and outputting an XR image, the autonomous vehicle 12 may provide an XR object corresponding to a real object or an object on a screen to an occupant.

In this case, when the XR object is output to the HUD, at least a part of the XR object may be output to overlap with the actual object to which the occupant's eyes are directed. However, when the XR object is output to the display provided inside the autonomous vehicle 12, at least a part of the XR object may be output to overlap with an object on the screen. For example, the autonomous vehicle 12 may output XR objects corresponding to objects such as a road, another vehicle, a traffic light, a traffic sign, a motorcycle, a pedestrian, a building, and the like.

When the autonomous vehicle 12 to be an object of control/interaction in the XR image obtains sensor information from sensors including a camera, the autonomous vehicle 12 or the XR device 13 may generate an XR image based on the sensor information, and the XR device 13 may output the generated XR image. The autonomous vehicle 12 may operate based on a user's interaction or a control signal input through an external device such as the XR device 13.

EXtended Reality (XR) collectively refers to Virtual Reality (VR), Augmented Reality (AR), and Mixed Reality (MR). VR technology is computer graphic technology that provides an object or a background of a real world only to CG images, AR technology is computer graphic technology that together provides virtual CG images on real object images, and MR technology is computer graphic technology that provides by mixing and combining virtual objects in a real world.

MR technology is similar to AR technology in that it shows both a real object and a virtual object. However, there is a difference in that in AR technology, a virtual object is used in the form of supplementing a real object, but in MR technology, a virtual object and a real object are used in an equivalent nature.

XR technology may be applied to a Head-Mount Display (HMD), a Head-Up Display (HUD), a mobile phone, a tablet PC, a laptop computer, a desktop computer, a television, digital signage, etc. and a device to which XR technology is applied may be referred to an XR device.

A. Example of Block Diagram of UE and 5G Network

Figure 2:
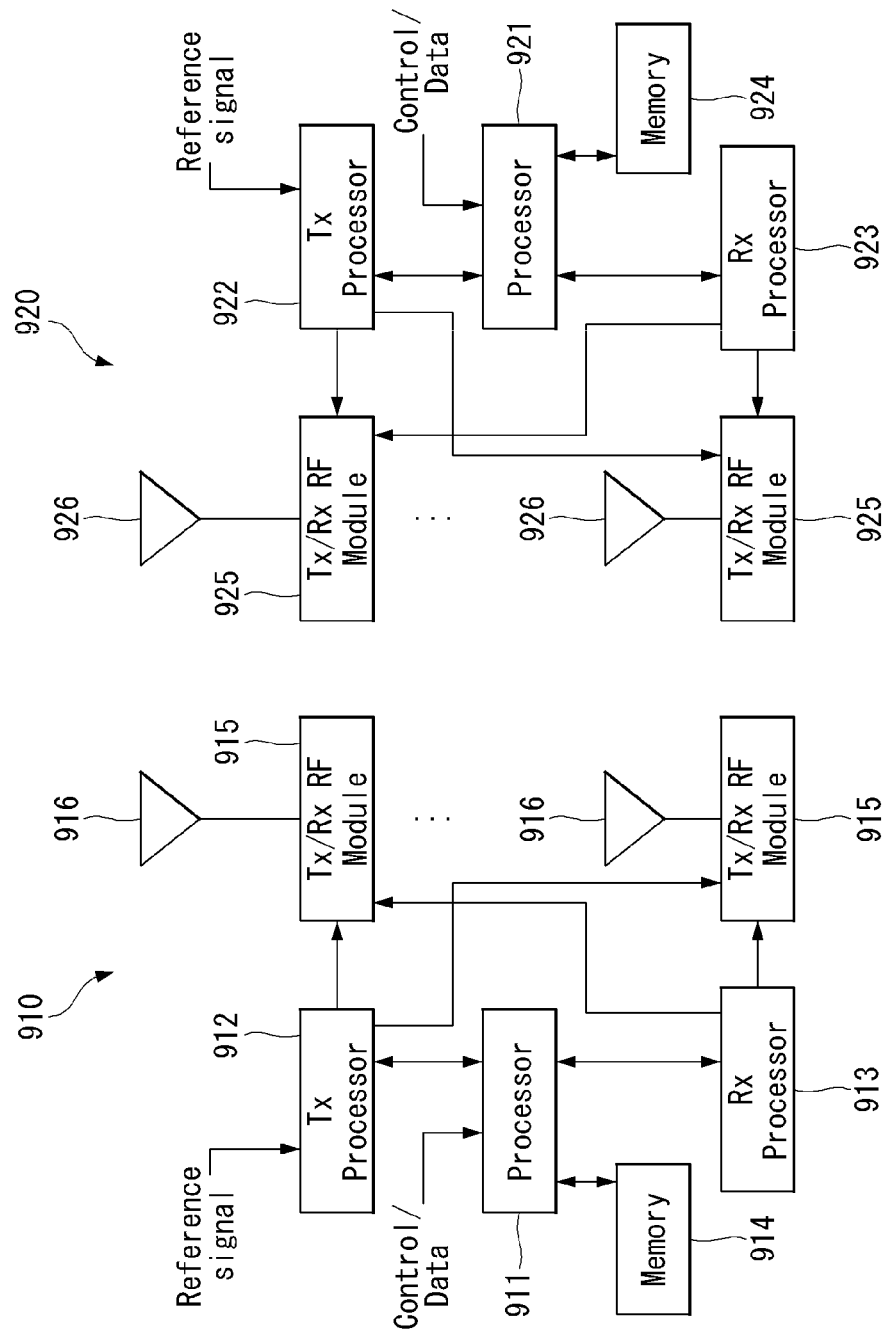
FIG. 2 is a block diagram illustrating a wireless communication system that can be applied to methods proposed in the present specification.

FIG. 2 is a block diagram of a wireless communication system to which methods proposed in the disclosure are applicable.

Referring to FIG. 2, a device (AI device) including an AI module is defined as a first communication device (910 of FIG. 2), and a processor 911 can perform detailed autonomous operations.

A 5G network including another device (AI server) communicating with the AI device is defined as a second communication device (920 of FIG. 2), and a processor 921 can perform detailed autonomous operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
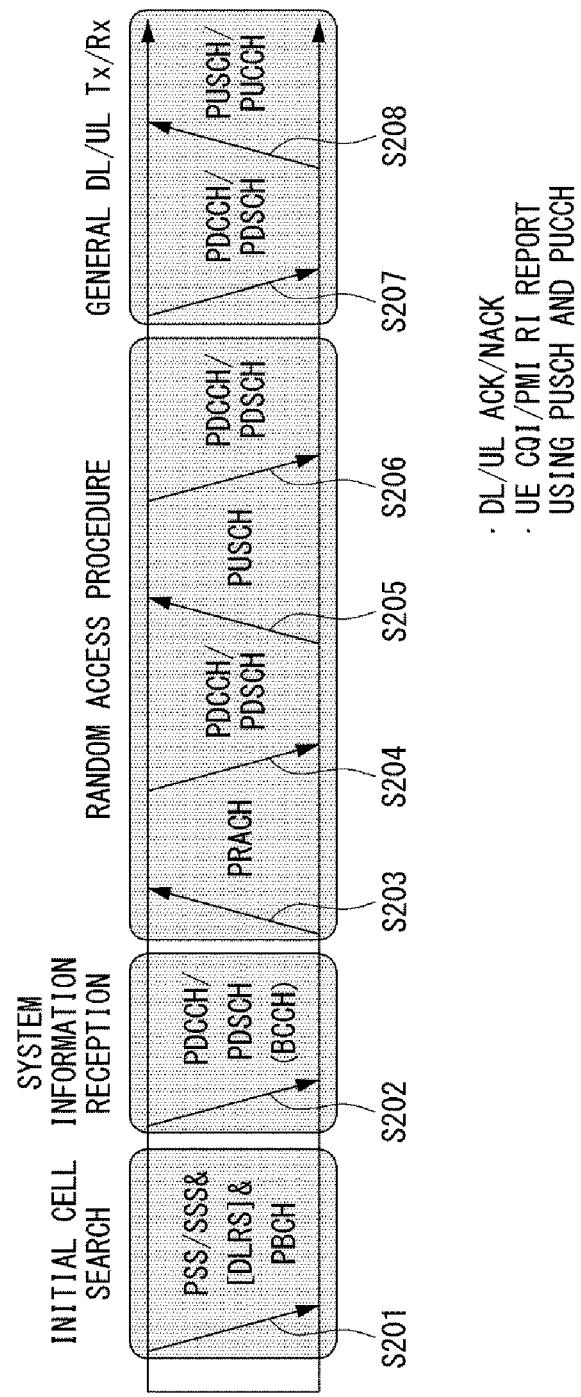
FIG. 3 is a diagram illustrating an example of a signal transmitting/receiving method in a wireless communication system.

FIG. 3 is a diagram showing an example of a signal transmission/reception method in a wireless communication system.

In a wireless communication system, a UE receives information from a base station through downlink (DL), and the UE transmits information to the base station through uplink (UL). The information transmitted and received by the base station and the UE includes data and various control information, and various physical channels exist according to a kind/use of information in which the base station and the UE transmit and receive.

When power of the UE is turned on or when the UE newly enters to a cell, the UE performs an initial cell search operation of synchronizing with the base station (S201). For this reason, the UE may receive a primary synchronization signal (PSS) and a secondary synchronization signal (SSS) from the base station to be synchronized with the base station and obtain information such as cell ID. Thereafter, the UE may receive a physical broadcast channel (PBCH) from the base station to obtain broadcast information within the cell. The UE may receive a downlink reference signal (DL RS) in an initial cell search step to check a downlink channel status.

The UE, having finished initial cell search may receive a physical downlink shared channel (PDSCH) according to a physical downlink control channel (PDCCH) and information loaded in the PDCCH to obtain more specific system information (S202).

When the UE first accesses to the base station or when there is no radio resource for signal transmission, the UE may perform a random access procedure (RACH) to the base station (S203 to S206). For this reason, the UE may transmit a specific sequence to a preamble through a physical random access channel (PRACH) (S203 and S205) and receive a random access response (RAR) message to the preamble through the PDCCH and the PDSCH corresponding thereto. In the case of a contention-based RACH, the UE may additionally perform a contention resolution procedure (S206).

The UE, having performed the above process may perform PDCCH/PDSCH reception (S207) and physical uplink shared channel (PUSCH)/physical uplink control channel (PUCCH) transmission (S208) as a general uplink/downlink signal transmission procedure. In particular, the UE receives downlink control information (DCI) through the PDCCH. Here, the DCI includes control information such as resource allocation information for the UE and may be applied in different formats according to a use purpose.

Control information transmitted by the UE to the base station through uplink or received by the UE from the base station may include a downlink/uplink ACK/NACK signal, a channel quality indicator (CQI), a precoding matrix index (PMI), and a rank indicator (RI). The UE may transmit control information such as the above-described CQI/PMI/RI through a PUSCH and/or a PUCCH.

The UE monitors a set of PDCCH candidates at monitoring occasions set to at least one control element sets (CORESETs) on a serving cell according to the corresponding search space configurations. A set of PDCCH candidates to be monitored by the UE is defined in terms of search space sets, and the search space sets may be a common search space set or a UE-specific search space set. The CORESET is configured with a set of (physical) resource blocks having time duration of 1 to 3 OFDM symbols. The network may set the UE to have a plurality of CORESETs. The UE monitors PDCCH candidates in at least one search space sets. Here, monitoring means attempting to decode the PDCCH candidate(s) in the search space. When the UE succeeds in decoding one of PDCCH candidates in a search space, the UE determines that the PDCCH has been detected in the corresponding PDCCH candidate, and performs PDSCH reception or PUSCH transmission based on DCI in the detected PDCCH. The PDCCH may be used for scheduling DL transmissions on the PDSCH and UL transmissions on the PUSCH. Here, DCI on the PDCCH includes a downlink assignment (i.e., downlink grant (DL grant)) including at least modulation and coding format and resource allocation information related to a downlink shared channel or uplink grant (UL grant) including modulation and coding format and resource allocation information related to an uplink shared channel.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.
  The UE repeatedly receives signals on resources in a CSI-RS resource set in which the RRC parameter 'repetition' is set to 'ON' in different OFDM symbols through the same Tx beam (or DL spatial domain transmission filters) of the BS.
  The UE determines an RX beam thereof
  The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
  The UE receives signals on resources in a CSI-RS resource set in which the RRC parameter 'repetition' is set to 'OFF' in different DL spatial domain transmission filters of the BS.
  The UE selects (or determines) a best beam.
  The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
  The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
  When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 4:
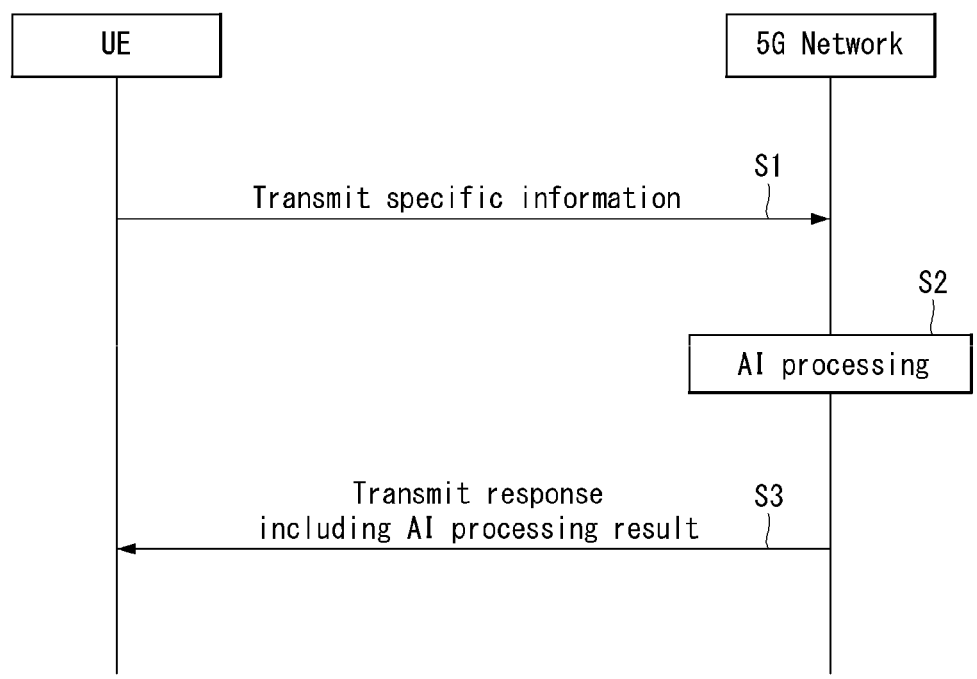
FIG. 4 illustrates an example of a basic operation of a user terminal and a 5G network in a 5G communication system.

FIG. 4 shows an example of basic operations of an UE and a 5G network in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an AI using 5G communication will be described in more detail with reference to wireless communication technology (BM procedure, URLLC, mMTC, etc.) described in FIGS. 2 and 3.

First, a basic procedure of an applied operation to which a method proposed by the present disclosure which will be described later and eMBB of 5G communication are applied will be described.

As in steps S1 and S3 of FIG. 4, the UE performs an initial access procedure and a random access procedure with the 5G network prior to step S1 of FIG. 4 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
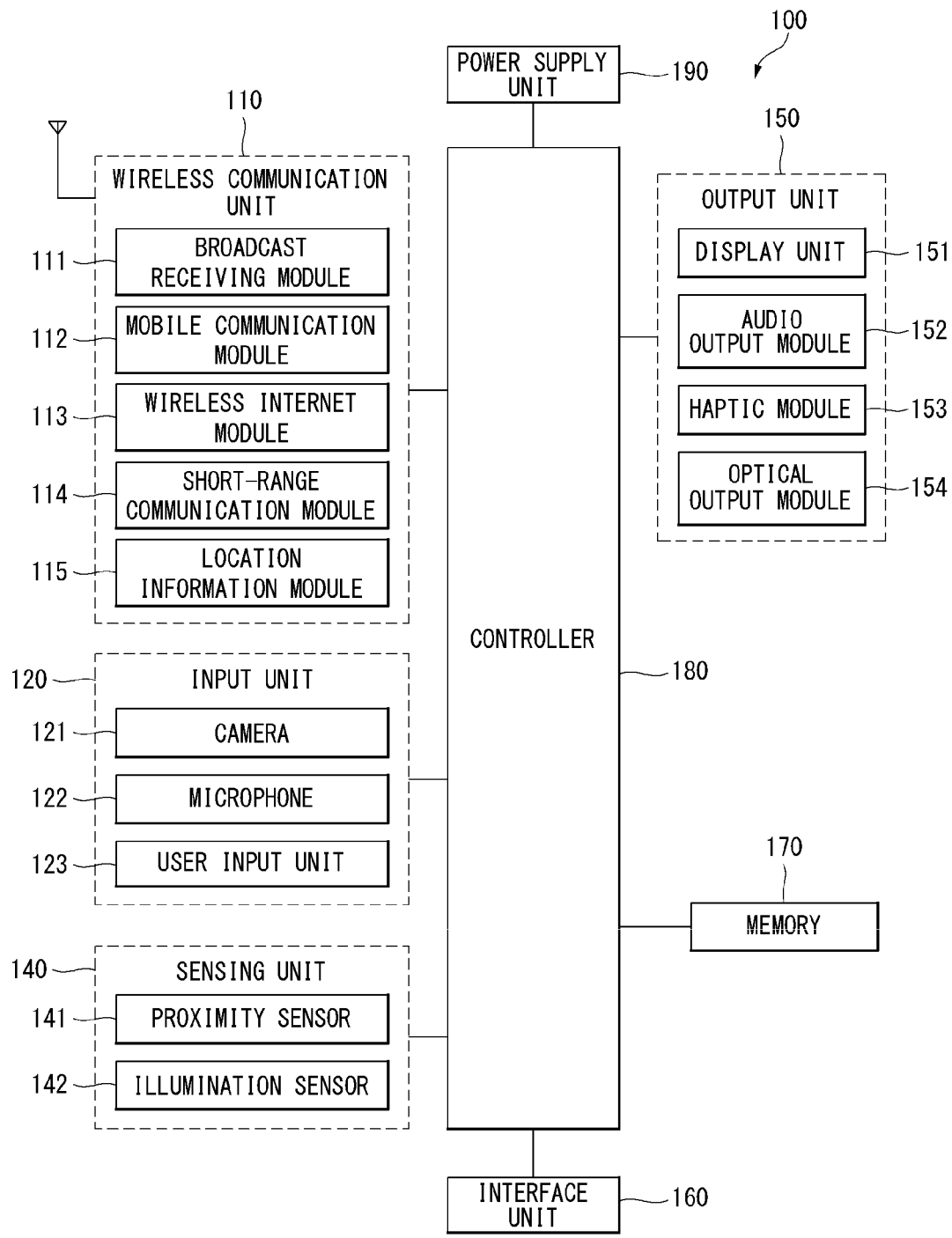
FIG. 5 is a block diagram illustrating a terminal according to an embodiment of the present disclosure.

FIG. 5 is a block diagram illustrating a mobile terminal related to the present disclosure.

Referring to FIG. 5, a mobile terminal 100 may include a wireless communication unit 110, an input unit 120, a sensing unit 140, an output unit 150, an interface unit 160, a memory 170, a controller 180, and a power supply unit 190. The components shown in FIG. 5 are not essential to implementing a mobile terminal and thus a mobile terminal described in the present description may have more or fewer components than those listed above.

More specifically, among the components, the wireless communication unit 110 may include at least one module that enables wireless communication between the mobile terminal 100 and the wireless communication system, between the mobile terminal 100 and another mobile terminal 100, or between the mobile terminal 100 and an external server. Further, the wireless communication unit 110 may include at least one module for connecting the mobile terminal 100 to at least one 5G network. A detailed description thereof has been described in detail with reference to FIGS. 1 to 4, and thus a description thereof will be omitted.

The wireless communication unit 110 may include at least one of a broadcast receiving module 111, a mobile communication module 112, a wireless Internet module 113, a short-range communication module 114, and a position information module 115.

The input unit 120 may include a camera 121 or an image input unit for inputting an image signal, a microphone 122 for inputting an audio signal, an audio input unit, or a user input unit 123, for example, a touch key and a mechanical key for receiving information from a user. Audio data or image data collected by the input unit 120 may be analyzed and be processed as a control command of the user.

The sensing unit 140 may include at least one sensor for sensing at least one of information in the mobile terminal, surrounding environment information enclosing the mobile terminal, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, a red, green, and blue (RGB) sensor, an infrared sensor (IR sensor), a fingerprint scan sensor, an ultrasonic sensor, an optical sensor (e.g., the camera 121), a microphone 122, a battery gauge, an environment sensor (e.g., barometer, hygrometer, thermometer, radiation detection sensor, thermal detection sensor, gas detection sensor), a chemical sensor (e.g., electronic nose, healthcare sensor, biometric recognition sensor). The mobile terminal disclosed in the present specification may utilize a combination of information detected by at least two or more of these sensors.

The output unit 150 generates an output related to sight, hearing, or tactile sense, and may include at least one of a display unit 151, an audio output unit 152, a haptic module 153, and a light output unit 154. The display unit 151 may form a mutual layer structure with the touch sensor or may be integrally formed with the touch sensor, thereby implementing a touch screen. The touch screen may provide an output interface between the mobile terminal 100 and the user while functioning as the user input unit 123 that provides an input interface between the mobile terminal 100 and the user.

The interface unit 160 serves as a path to various types of external devices connected to the mobile terminal 100. The interface unit 160 may include at least one of a wired/wireless headset port, an external charger port, a wired/wireless data port, a memory card port, a port that connects a device equipped with an identification module, an audio input/output (I/O) port, a video input/output (I/O) port, and an earphone port. In the mobile terminal 100, the appropriate control related to a connected external device may be performed according to the external device connected to the interface unit 160.

Further, the memory 170 stores data that support various functions of the mobile terminal 100. The memory 170 may store a plurality of application programs or applications driven in the mobile terminal 100, data for operating the mobile terminal 100, and instructions. At least some of these application programs may be downloaded from an external server through wireless communication. Further, at least some of these application programs may exist on the mobile terminal 100 from the time of launching for basic functions (e.g., a call receiving or transmitting function, a message receiving or transmitting function) of the mobile terminal 100. The application program may be stored in the memory 170, installed on the mobile terminal 100, and driven by the controller 180 to perform an operation (or function) of the mobile terminal.

In addition to the operation related to the application program, the controller 180 typically controls an overall operation of the mobile terminal 100. By processing signals, data, information, and the like, which are input or output through the above-described components or by driving an application program stored in the memory 170, the controller 180 may provide or process information or a function appropriate to a user.

Further, in order to drive an application program stored in the memory 170, the controller 180 may control at least some of the components described with reference to FIG. 5. Further, in order to drive the application program, the controller 180 may combine and operate at least two or more of the components included in the mobile terminal 100.

The power supply unit 190 receives power from an external power source and an internal power source under the control of the controller 180 to supply power to each component included in the mobile terminal 100. The power supply unit 190 includes a battery, which may be a built-in battery or a replaceable battery.

In order to implement an operation, control, or control method of the mobile terminal according to various embodiments described below, at least some of the components may operate in cooperation with each other. Further, the operation, control, or control method of the mobile terminal may be implemented on the mobile terminal by driving at least one application program stored in the memory 170.

The display unit 151 displays (outputs) information processed by the mobile terminal 100. For example, the display unit 151 may display execution screen information of an application program driven in the mobile terminal 100 or user interface (UI) and graphical user interface (GUI) information according to the execution screen information.

The display unit 151 may include at least one of a liquid crystal display (LCD), a thin film transistor-liquid crystal display (TFT LCD), an organic light-emitting diode (OLED), a flexible display, a three-dimensional display (3D display), and an e-ink display.

Further, there may be two or more display units 151 according to an implementation form of the mobile terminal 100. In this case, in the mobile terminal 100, a plurality of display units may be separated at one surface or may be integrally disposed, and at different surfaces, each display unit may be disposed.

In order to receive a control command by a touch method, the display unit 151 may include a touch sensor that detects a touch on thereon. Using this, when a touch is performed on the display unit 151, the touch sensor may detect the touch, and the controller 180 may generate a control command corresponding to the touch based on the touch. The content input by the touch method may be texts or numbers or menu items that may be instructed or designated in various modes.

The touch sensor may be configured in a form of a film having a touch pattern and be disposed between a window and a display (not shown) on a rear surface of the window or may be a metal wire directly patterned on the rear surface of the window. Alternatively, the touch sensor may be formed integrally with the display. For example, the touch sensor may be disposed on a substrate of the display or may be provided inside the display.

In this way, the display unit 151 may form a touch screen together with the touch sensor, and in this case, the touch screen may function as the user input unit 123. In some cases, the touch screen may replace at least some functions of a first manipulation unit.

The first sound output unit may be implemented into a receiver for transmitting a call sound to the user's ear, and the second sound output unit may be implemented in the form of a loud speaker that outputs various alarm sounds or reproduction sounds of multimedia.

A sound hole for emitting a sound generated from the first sound output unit may be formed in the window of the display unit 151. However, the present disclosure is not limited thereto, and the sound may be emitted along an assembly gap between the structures (e.g., a gap between the window and the front case). In this case, an independently formed hole for sound output may be externally invisible or hidden, thereby more simplifying an external shape of the mobile terminal 100.

The light output unit 154 may be configured to output light for notifying when an event occurs. Examples of the event may include message reception, call signal reception, missed call, alarm, schedule notification, email reception, information reception through an application, and the like. When the user's event check is detected, the controller 180 may control the light output unit 154 so as to end the light output.

The first camera processes an image frame of still pictures or moving pictures obtained by image sensors in an audio-visual call mode or a photographing mode. The processed image frames may be displayed on the display unit 151 and be stored in the memory 170.

The first to third manipulation units may be collectively referred to as a manipulating portion as an example of the user input unit 123 manipulated to receive a command for controlling an operation of the mobile terminal 100. The first to third manipulation units may be employed in any manner as long as the user manipulates with a tactile feeling such as touch, push, scroll, and the like. Further, the first and second manipulation units may be employed in such a manner that the first and second manipulation units operate without a tactile feeling of the user through a proximity touch, a hovering touch, or the like. The third manipulation unit may include a fingerprint recognition sensor to obtain a user's fingerprint. The obtained fingerprint information may be provided to the controller 180.

In the drawing, the first manipulation unit is illustrated as being a touch key, but the present disclosure is not limited thereto. For example, the first manipulation unit may be a mechanical key or may be configured with a combination of a touch key and a mechanical key.

The contents input by the first and second manipulation units may be variously set. For example, the first manipulation unit may receive a command such as a menu, a home key, a cancellation, a search, etc., and the second manipulation unit may receive adjustment in a volume of a sound output from the first or second sound output unit and a command such as switching to a touch recognition mode of the display unit 151.

As another example of the user input unit 123, a third manipulation unit may be provided at the rear surface of the terminal body. The third manipulation unit is manipulated to receive a command for controlling an operation of the mobile terminal 100, and the input content may be variously set.

For example, commands such as power on/off, start, end, and scrolling and commands such as adjustment in a volume of a sound output from the first and second sound output units, switching to a touch recognition mode of the display unit 151, and fingerprint information acquisition may be received. The rear input unit may be implemented in a form of a touch input, a push input, or an input by a combination thereof.

The rear input unit may be disposed to overlap with the front display unit 151 in a thickness direction of the terminal body. For example, the rear input unit may be disposed at the upper end of a rear surface of the terminal body so that the user may easily manipulate the terminal using an index finger when the user grips the terminal body with one hand. However, the present disclosure is not necessarily limited thereto, and a position of the rear input unit may be changed.

In this way, when the rear input unit is provided at the rear surface of the terminal body, a new type user interface using the rear input unit may be implemented. Further, when the above-described touch screen or rear input unit replaces at least some functions of the first manipulation unit provided in the front surface of the terminal body and the first manipulation unit is not disposed at the front surface of the terminal body, the display unit 151 may be configured in a larger surface.

The mobile terminal 100 may be provided with a fingerprint recognition sensor for recognizing a user's fingerprint, and the controller 180 may use fingerprint information detected through the fingerprint recognition sensor as an authentication means. The fingerprint recognition sensor may be embedded in the display unit 151 or the user input unit 123.

The microphone 122 may be configured to receive a user's voice, other sounds, and the like. The microphone 122 may be provided at a plurality of positions and be configured to receive a stereo sound.

The interface unit 160 serves as a path for connecting the mobile terminal 100 to an external device. For example, the interface unit 160 may be at least one of a connection terminal for connecting to another device (e.g., an earphone or an external speaker), a port (e.g., infrared port (IrDA Port), Bluetooth port, or a wireless LAN port) for short-range communication, or a power supply terminal for supplying power to the mobile terminal 100. The interface unit 160 may be implemented in the form of a socket for receiving an external card such as a subscriber identification module (SIM), a user identity module (UIM), or a memory card for storing information.

The second camera may be disposed at the rear surface of the terminal body. In this case, a second camera 121*b* has a photographing direction substantially opposite to that of the first camera.

The second camera may include a plurality of lenses arranged along at least one line. The plurality of lenses may be arranged in a matrix format. Such a camera may be referred to as an "array camera". When the second camera is configured as an array camera, the plurality of lenses may be used to photograph images in various ways, and images of a better quality may be obtained.

A flash 124 may be disposed adjacent to the second camera. When a subject is photographed by the second camera, the flash 124 emits light toward the subject.

The second sound output unit may be additionally disposed in the terminal body. The second sound output unit may implement a stereo function together with the first sound output unit, and may be used for implementing a speakerphone mode during a call.

The terminal body may be provided with at least one antenna for wireless communication. The antenna may be built in the terminal body or may be formed in the case. For example, an antenna that forms part of the broadcast receiving module 111 (see FIG. 5) may be configured to be pulled out from the terminal body. Alternatively, the antenna may be formed in a film type to be attached to an inner side surface of the rear cover 103 or may be configured such that a case including a conductive material functions as an antenna.

The terminal body is provided with the power supply unit 190 (see FIG. 5) for supplying power to the mobile terminal 100. The power supply unit 190 may include a battery 191 embedded in the terminal body or detachably configured from the outside of the terminal body.

The battery 191 may be configured to receive power through a power cable connected to the interface unit 160. Further, the battery 191 may be configured to enable wireless charging through a wireless charger. The wireless charging may be implemented by a magnetic induction method or a resonance method (magnetic resonance method).

Figure 6:
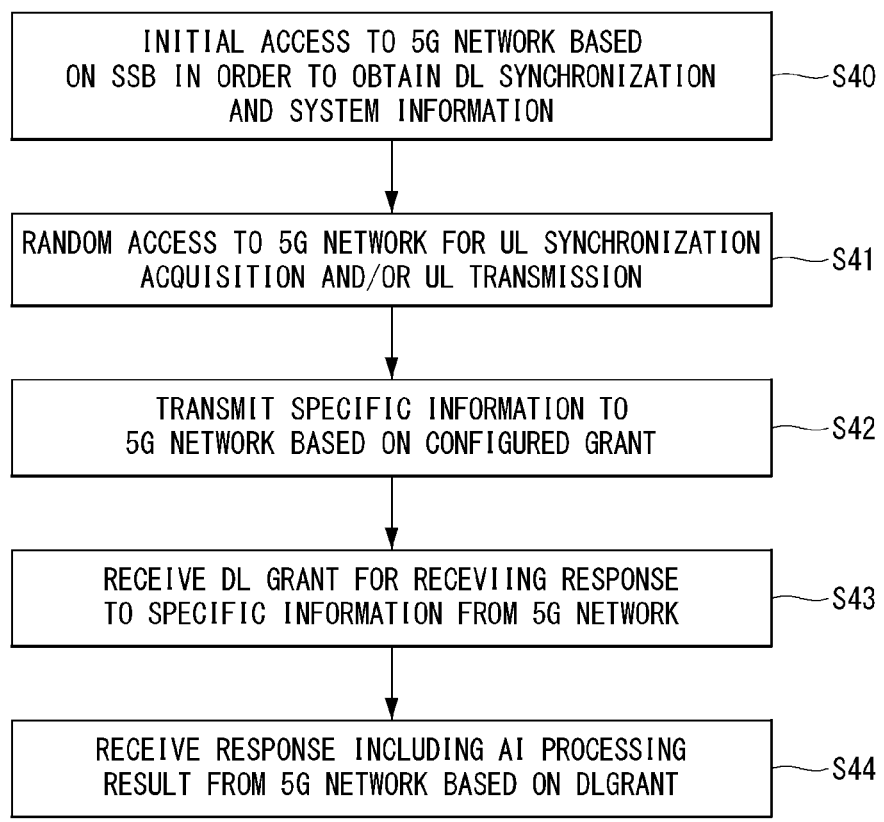
FIG. 6 illustrates an example of an operation of a user terminal using 5G communication.

FIG. 6 illustrates an example of an operation of a user terminal using 5G communication.

Next, referring to FIG. 6, the UE performs an initial access procedure with the 5G network based on SSB to obtain DL synchronization and system information (S40).

Then, the UE performs a random access procedure with the 5G network for UL synchronization acquisition and/or UL transmission (S41).

Then, the UE transmits the specific information to the 5G network based on a configured grant (S42). A procedure for configuring the grant in place of receiving the UL grant from the 5G network will be described in more detail in paragraph H.

Then, the UE receives a DL grant for receiving a response to the specific information from the 5G network (S43).

Then, the UE receives the response including the AI processing result from the 5G network based on the DL grant (S44).

Figure 7:
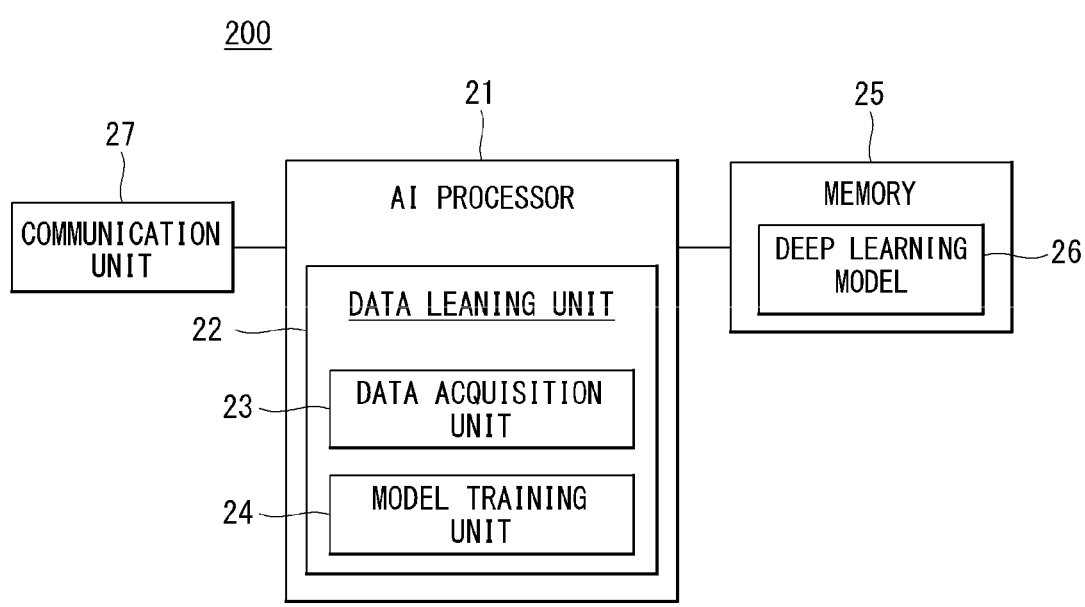
FIG. 7 is a block diagram illustrating an AI device according to an embodiment of the present disclosure.

FIG. 7 is a block diagram illustrating an AI device according to an embodiment of the present disclosure.

An AI device 200 may include an electronic device including an AI module that may perform AI processing or a server including the AI module. Further, the AI device 200 may be included as at least some components of the mobile terminal 100 of FIG. 5 to together perform at least some of AI processing.

The AI processing may include all operations related to the control of the mobile terminal 100 shown in FIG. 5. For example, by performing AI processing of sensing data or obtained data, the mobile terminal 100 may perform processing/determination and control signal generation operations. Further, for example, the mobile terminal 100 may perform AI processing of data received through the communication unit to perform the control of the mobile terminal 100.

The AI device 200 may include an AI processor 21, a memory 25 and/or a communication unit 27.

The AI processor 200 is a computing device that may leant a neural network and may be implemented into various electronic devices such as a server, a desktop PC, a notebook PC, and a tablet PC.

The AI processor 21 may learn a neural network using a program stored in the memory 25. In particular, the AI processor 21 may learn a neural network for recognizing data related to the mobile terminal 100. Here, the neural network for recognizing data related to the mobile terminal 100 may be designed to simulate a human brain structure on a computer and include a plurality of network nodes having a weight and simulating a neuron of the human neural network. The plurality of network modes may give and receive data according to each connection relationship so as to simulate a synaptic activity of neurons that send and receive signals through a synapse. Here, the neural network may include a deep leaning model developed in the neural network model. In the deep learning model, while a plurality of network nodes is positioned in different layers, the plurality of network nodes may send and receive data according to a convolution connection relationship. An example of the neural network model includes various deep learning techniques such as deep neural networks (DNN), convolutional deep neural networks (CNN), Recurrent Boltzmann Machine (RNN), Restricted Boltzmann Machine (RBM), deep belief networks (DBN), and a deep Q-network and may be applied to the field of computer vision, speech recognition, natural language processing, and voice/signal processing.

The processor for performing the above-described function may be a general-purpose processor (e.g., CPU), but may be an AI dedicated processor (e.g., GPU) for learning AI.

The memory 25 may store various programs and data necessary for an operation of the AI device 200. The memory 25 may be implemented into a non-volatile memory, a volatile memory, a flash memory, a hard disk drive (HDD), or a solid state drive (SDD) and the like. The memory 25 may be accessed by the AI processor 21 and read/write/modify/delete/update of data may be performed by the AI processor 21. Further, the memory 25 may store a neural network model (e.g., a deep learning model 26) generated through learning algorithm for data classification/recognition according to an embodiment of the present disclosure.

The AI processor 21 may include a data learning unit 22 for learning a neural network for data classification/recognition. The data learning unit 22 may learn learning data to use in order to determine data classification/recognition and a criterion for classifying and recognizing data using learning data. By obtaining learning data to be used for learning and applying the obtained learning data to a deep learning model, the data learning unit 22 may learn a deep learning model.

The data learning unit 22 may be produced in at least one hardware chip form to be mounted in the AI device 200. For example, the data learning unit 22 may be produced in a dedicated hardware chip form for artificial intelligence (AI) and may be produced in a part of a general-purpose processor (CPU) or a graphic dedicated processor (GPU) to be mounted in the AI device 200. Further, the data learning unit 22 may be implemented into a software module. When the data learning unit 22 is implemented into a software module (or program module including an instruction), the software module may be stored in non-transitory computer readable media. In this case, at least one software module may be provided by an Operating System (OS) or may be provided by an application.

The data learning unit 22 may include a learning data acquisition unit 23 and a model learning unit 24.

The learning data acquisition unit 23 may obtain learning data necessary for a neural network model for classifying and recognizing data. For example, the learning data acquisition unit 23 may obtain data and/or sample data of the mobile terminal 100 for inputting as learning data to the neural network model.

The model learning unit 24 may learn to have a determination criterion in which a neural network model classifies predetermined data using the obtained learning data. In this case, the model learning unit 24 may learn a neural network model through supervised learning that uses at least a portion of the learning data as a determination criterion. Alternatively, the model learning unit 24 may learn the neural network model through unsupervised learning that finds a determination criterion by self-learning using learning data without supervision. Further, the model learning unit 24 may learn the neural network model through reinforcement learning using feedback on whether a result of situation determination according to learning is correct. Further, the model learning unit 24 may learn the neural network model using learning algorithm including error back-propagation or gradient decent.

When the neural network model is learned, the model learning unit 24 may store the learned neural network model in the memory. The model learning unit 24 may store the learned neural network model at the memory of the server connected to the AI device 200 by a wired or wireless network.

In order to improve an analysis result of a recognition model or to save a resource or a time necessary for generation of the recognition model, the data learning unit 22 may further include a learning data pre-processor (not illustrated) and a learning data selecting unit (not illustrated).

The learning data pre-processor may pre-process obtained data so that the obtained data may be used in learning for situation determination. For example, the learning data pre-processor may process the obtained data in a predetermined format so that the model learning unit 24 uses obtained learning data for learning for image recognition.

Further, the learning data selection unit may select data necessary for learning among learning data obtained from the learning data acquisition unit 23 or learning data pre-processed in the pre-processor. The selected learning data may be provided to the model learning unit 24. For example, by detecting a specific area of an image obtained through a camera of the mobile terminal 100, the learning data selection unit may select only data of an object included in the specified area as learning data.

Further, in order to improve an analysis result of the neural network model, the data learning unit 22 may further include a model evaluation unit (not illustrated).

The model evaluation unit inputs evaluation data to the neural network model, and when an analysis result output from evaluation data does not satisfy predetermined criteria, the model evaluation unit may enable the model learning unit 24 to learn again. In this case, the evaluation data may be data previously defined for evaluating a recognition model. For example, when the number or a proportion of evaluation data having inaccurate analysis results exceeds a predetermined threshold value among analysis results of a learned recognition model of evaluation data, the model evaluation unit may evaluate evaluation data as data that do not satisfy predetermined criteria.

The communication unit 27 may transmit an AI processing result by the AI processor 21 to an external electronic device.

It has been described that the AI device 200 of FIG. 7 is functionally divided into the AI processor 21, the memory 25, and the communication unit 27, but the above-mentioned components may be integrated into a single module to be referred to as an AI module.

Recently, with the development of information and communication technology, diversification and functions of smartphones have been much improved. Accordingly, spread of smartphones has been rapidly progressed, and more than one smartphone per person is being distributed.

With the spread of smartphones, in a specific situation, a situation has occurred in which notification providing is required through a notification setting appropriate to the situation, and there has been inconvenience in that a user should change a notification setting each time in a specific situation for an appropriate notification setting and there was a problem that a case occurs in which the user does not change the notification setting by an error.

In the present specification, in order to solve the above-described inconvenience and problem, a method is proposed in which the smartphone recognizes a surrounding situation to provide a notification through notification setting appropriate to the surrounding situation.

Hereinafter, the smartphone described in the present specification may be used interchangeably with the terminal.

Figure 8:
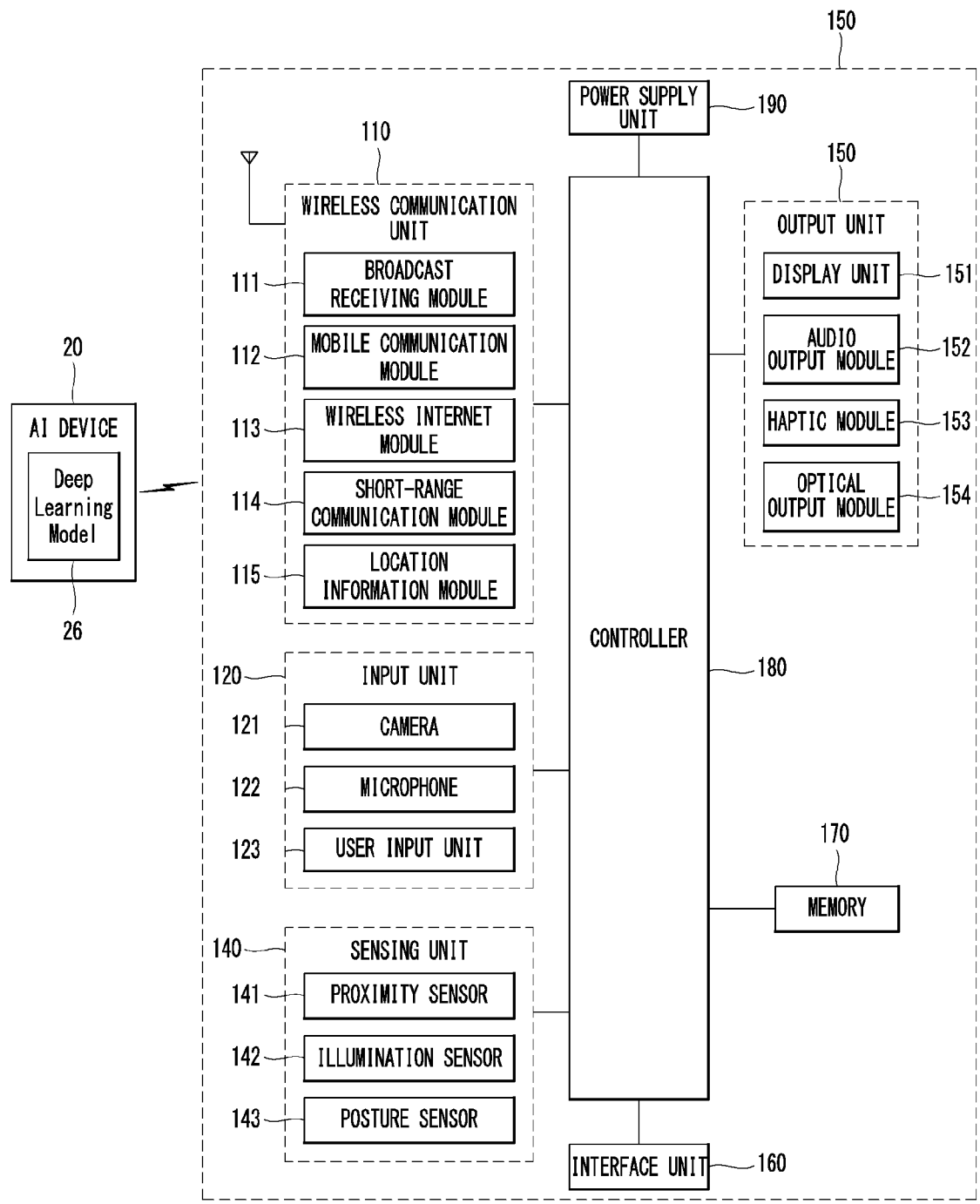
FIG. 8 is a diagram illustrating a system related to an intelligent electronic device and an AI device according to an embodiment of the present disclosure.

FIG. 8 is a diagram illustrating a system related to an intelligent electronic device and an AI device according to an embodiment of the present disclosure.

Referring to FIG. 8, the intelligent electronic device may transmit data requiring AI processing to an AI device 20 through a communication unit, and the AI device 20 including a deep learning model 26 may transmit a result of AI processing using the deep learning model 26 to the intelligent electronic device. The AI device 20 may refer to the contents described with reference to FIG. 7.

An intelligent electronic device 100 may include a wireless communication unit 110, an input unit 120, a sensing unit 140, an output unit 150, an interface unit 160, a memory 170, a processor 180, and a power supply unit 190, and the processor 180 may further include an AI processor 181.

The wireless communication unit 110, the input unit 120, the sensing unit 140, the output unit 150, the interface unit 160, the memory 170, and the power supply unit 190 have been described in detail with reference to FIG. 5 and therefore a detailed description thereof will be omitted.

The intelligent electronic device 100 may transmit data obtained through the at least one sensor to the AI device 20 through the wireless communication unit 110. The AI device 20 may transmit AI processing data generated by applying the neural network model 26 to the transmitted data to the intelligent electronic device 100.

The intelligent electronic device 100 may recognize sensing information based on the received AI processing data, and the processor 180 may perform a control operation of a disturbance interruption mode using the recognized sensing information. The disturbance interruption mode may be referred to as etiquette mode or a silent mode. The disturbance interruption mode may be a mode capable of controlling at least one of a sound related setting, a screen brightness related setting, a vibration related setting, and a screen motion related setting.

The intelligent electronic device 100 may transmit data necessary for controlling the disturbance interruption mode to the AI device 20 through the wireless communication unit 110, and the AI device 20 may transmit AI processing data generated by applying the transmitted data to the neural network model 26 to the intelligent electronic device 100. The intelligent electronic device 100 may control the disturbance interruption mode based on the received AI processing data.

By applying a neural network model to sensing data generated by at least one sensor, the AI processor 181 may generate state data of a surrounding environment. AI processing data generated by applying the neural network model may include data on illuminance information by sensing ambient brightness, data on sound information by sensing ambient sound, data on moving distance information by sensing a moving distance, and the like.

The processor 180 may generate a signal related to the disturbance interruption mode based on a current position of the AI processed intelligent electronic device 100 and state data on the surrounding situation.

The intelligent electronic device 100 may transmit sensing data obtained through the at least one sensor to the AI device 20 through the communication unit 110, and the AI device 20 may transmit AI processing data generated by applying the neural network model 26 to the transmitted sensing data to the intelligent electronic device 100.

The position information module 115 may generate position data of the intelligent electronic device 100. The position information module 115 may include at least one of a global positioning system (GPS) and a differential global positioning system (DGPS).

By applying a neural network model to position data generated by the position information module 115, the AI processor 181 may generate more accurate position data of the intelligent electronic device 100.

According to one embodiment, the AI processor 181 may perform a deep learning operation based on at least one of an inertial measurement unit (IMU) and a camera image of the sensing unit 140, and correct position data based on the generated AI processing data.

The intelligent electronic device 100 may transmit position data obtained from the position information module 115 to the AI device 20 through the wireless communication unit 110, and the AI device 20 may transmit AI processing data generated by applying the neural network model 26 to the received position data to the position information module 115.

By applying at least one sensor provided in the intelligent electronic device 100, movie theater related information received from an external device, and information received from WiFi communicating with the intelligent electronic device 100 to the neural network model, the AI processor 181 may transfer a control signal capable of determining a disturbance interruption mode to the processor 180.

The processor 180 may obtain information about a position of the intelligent electronic device 100 or information about a surrounding situation through the AI processor 181, and perform a switching operation of setting a disturbance interruption mode based on the obtained information or releasing the preset disturbance interruption mode.

In the above description, a schematic description of 5G communication necessary for implementing a mode setting method of an intelligent electronic device according to an embodiment of the present disclosure and performing AI processing by applying 5G communication, and transmitting and receiving AI processing results has been described.

Hereinafter, a specific method of passively or actively intervening in a careless state of a user based on information of a current position of the user according to an embodiment of the present disclosure will be described with reference to the accompanying drawings.

Figure 9:
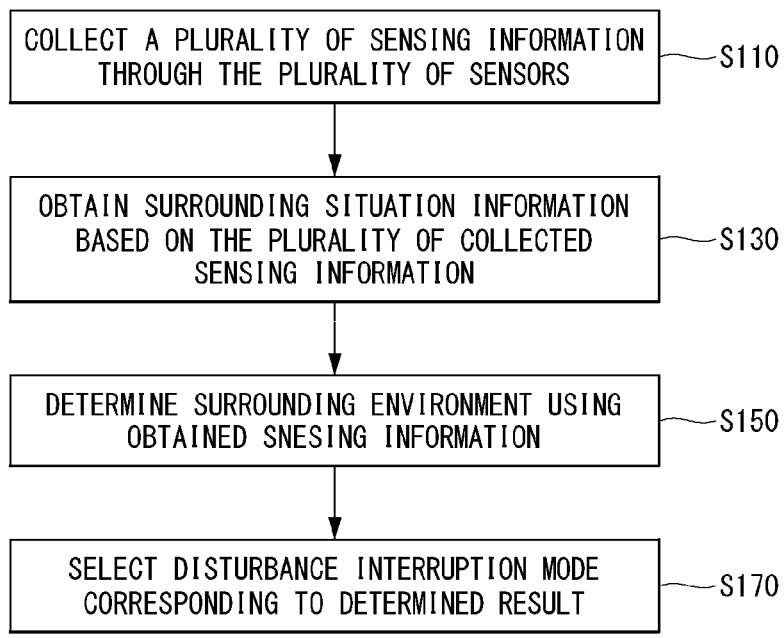
FIG. 9 is a flowchart illustrating a mode setting method of an intelligent electronic device according to an embodiment of the present disclosure.

FIG. 9 is a flowchart illustrating a mode setting method of an intelligent electronic device according to an embodiment of the present disclosure.

A mode setting method of an intelligent electronic device according to an embodiment of the present disclosure may be implemented in an intelligent device including a function described with reference to FIGS. 1 to 8. More specifically, a mode setting method of an intelligent electronic device according to an embodiment of the present disclosure may be implemented in the intelligent electronic device 100 described with reference to FIGS. 5, 7, and 8.

The processor (180 of FIG. 5) may collect a plurality of sensing information through a plurality of sensors. The processor 180 may collect various sensor information through at least one sensor provided in the intelligent electronic device (100 of FIG. 5) (S110).

The plurality of sensors may include an illuminance sensor, a sound sensor, and a position sensor provided in the intelligent electronic device 100. For example, the illuminance sensor may sense brightness of a periphery of the intelligent electronic device 100. The illumination sensor may sense ambient brightness of the intelligent electronic device 100 at every predetermined time. The user may set an interval of a sensing time according to a surrounding environment. The sound sensor may sense an ambient sound of the intelligent electronic device 100. The sound sensor may sense an ambient sound of the intelligent electronic device 100 at every predetermined time. The user may set an interval of a sensing time according to a surrounding environment. For example, when determining that the intelligent electronic device 100 is in a movie theater, the processor 180 may analyze information about a movie viewing time and reset an interval of the sensing time to be longer based on the analyzed movie viewing time.

The position sensor may sense a current position of the intelligent electronic device 100 in real time. The position sensor may use a GPS sensor so as to detect position information, and sensors may be triggered through position information and time information based on the GPS sensor. The position sensor may check a moving distance of the intelligent electronic device 100. The processor 180 may check a current position transmitted from the position sensor in real time, calculate a movement distance from a previous position based on the checked current position, and compare the calculated movement distance with a preset distance range. The processor 180 may compare and analyze the calculated moving distance and the preset distance range, and determine whether the intelligent electronic device 100 has deviated from a specific location based on the moving distance and the preset distance range.

The processor 180 may obtain surrounding situation information based on the plurality of collected sensing information (S130). The processor 180 may collect the collected illumination information, sound information, and position information in real time or at regular time intervals. The processor 180 may obtain information about a current position of the intelligent electronic device 100 through the position information, obtain information about ambient brightness of a current position of the intelligent electronic device 100 through the illuminance sensor, and obtain sound information generated at a current position and a periphery of the intelligent electronic device 100 through the sound sensor. The processor 180 may store the obtained surrounding situation information in a memory.

The processor 180 may analyze or compare and analyze the plurality of obtained sensing information, and learn based thereon. The processor 180 may determine a surrounding environment of the intelligent electronic device 100 using the plurality of learned sensing information (S150).

The processor 180 may recognize a current position of the user based on position information among the plurality of sensing information, and determine a surrounding environment of the current position of the user recognized through illumination information or sound information among the plurality of sensing information.

A detailed process of determining the surrounding environment will be described later with reference to FIG. 10. As described above, determination of the surrounding environment based on position information, noise information, and illuminance information may be performed in the intelligent electronic device 100 or may be performed in a 5G network.

The processor 180 may select a disturbance interruption mode corresponding to the determined result (S170). The processor 180 may set or release the disturbance interruption mode based on the determined result. For example, if the learned surrounding environment is a specific location, the processor 180 may set a disturbance interruption mode, and if the learned surrounding environment is not a specific location, the processor 180 may release the preset disturbance interruption mode. The processor 180 may change a current mode to the selected disturbance interruption mode.

Figure 10:
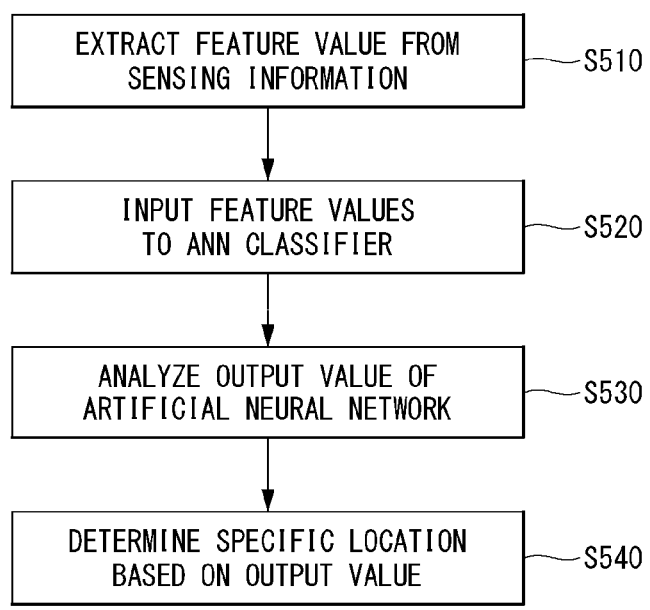
FIG. 10 is a diagram illustrating an example of determining a specific location through a recognized surrounding environment in one embodiment of the present disclosure.

FIG. 10 is a diagram illustrating an example of determining a specific location through a recognized surrounding environment in one embodiment of the present disclosure.

Referring to FIG. 10, the processor 180 may extract a feature value from sensing information obtained by at least one sensor so as to determine a surrounding environment (S510).

The processor 180 may input feature values to an artificial neural network (ANN) classifier trained to distinguish whether a surrounding environment is a specific location. For example, the processor 180 may receive illuminance information, sound information, and position information from at least one sensor (e.g., illuminance sensor, sound sensor, and position sensor). The processor 180 may extract a feature value from each of the illuminance information, the sound information, and the position information. The feature value is determined by recognizing a surrounding environment of a current position among at least one feature that can be extracted from the illumination information, the sound information, and the position information, and specifically representing whether the surrounding environment is a specific location.

The processor 180 may control to input the feature values to an ANN classifier trained to distinguish whether the surrounding environment is a specific location (S520).

The processor 180 may combine the extracted feature values to generate a location detection input. The position detection input may be input to an ANN classifier traded to distinguish whether the surrounding environment is a specific location based on the extracted feature value.

The processor 180 may analyze an output value of the artificial neural network (S530) and determine a specific location based on the artificial neural network output value (S540).

The processor 180 may identify whether the surrounding environment is a specific location from the output of the artificial neural network classifier.

FIG. 10 illustrates an example in which an operation of identifying a specific location through AI processing is implemented in processing of the intelligent electronic device 100, but the present disclosure is not limited thereto. For example, the AI processing may be performed on a 5G network based on sensing information received from the intelligent electronic device 100.

Figure 11:
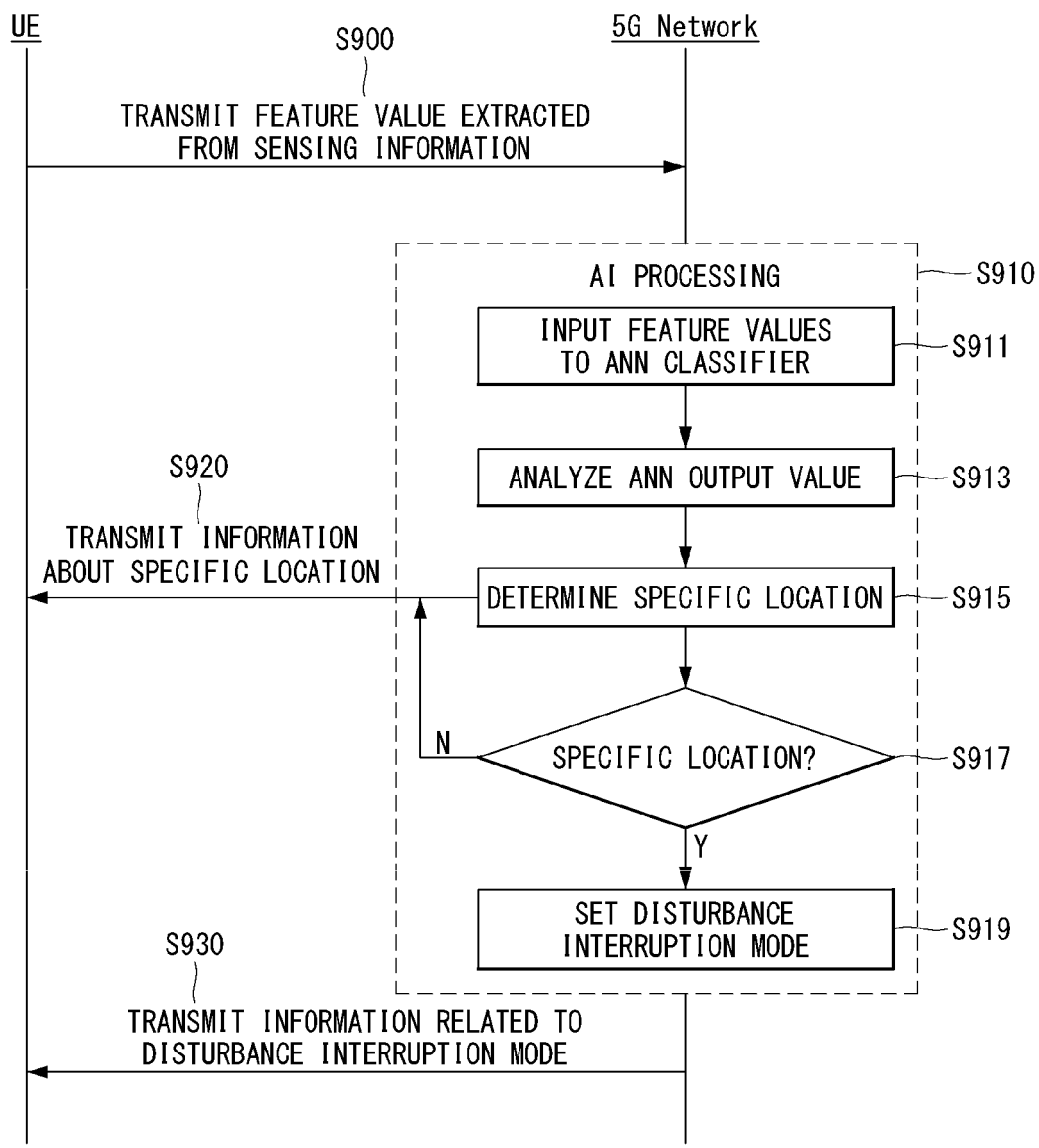
FIG. 11 is a diagram illustrating another example of determining a specific location through a recognized surrounding environment in one embodiment of the present disclosure.

FIG. 11 is a diagram illustrating another example of determining a specific location through a recognized surrounding environment in one embodiment of the present disclosure.

The processor 180 may control the communication unit to transmit the sensing information to the AI processor included in the 5G network. Further, the processor 180 may control the communication unit to receive AI processed information from the AI processor.

The AI processed information may be information that determines whether the surrounding environment is a specific location.

The intelligent diagnostic device 100 may perform an initial access procedure with the 5G network so as to transmit sensing information to the 5G network. The intelligent diagnostic device 100 may perform an initial connection procedure with the 5G network based on a synchronization signal block (SSB).

Further, the intelligent diagnostic device 100 may receive, from the network, downlink control information (DCI) used for scheduling transmission of sensing information obtained from at least one sensor provided therein through the wireless communication unit.

The processor 180 may transmit sensing information to the network based on the DCI.

The sensing information may be transmitted to the network through a Physical Uplink Shared Channel (PUSCH), and a demodulation reference signal (DM-RS) of the SSB and the PUSCH may be quasi co location (QCL) for QCL kind D.

Referring to FIG. 11, the intelligent diagnostic device 100 may transmit a feature value extracted from sensing information to a 5G network (S900).

Here, the 5G network may include an AI processor or an AI system, and the AI system of the 5G network may perform AI processing based on the received sensing information (S910).

The AI system may input feature values received from the intelligent diagnostic device 100 to the ANN classifier (S911). The AI system may analyze an ANN output value (S913) and determine a specific location from the ANN output value (S915). The 5G network may transmit information about a specific location determined in the AI system to the intelligent diagnosis device 100 through a wireless communication unit (S920).

Here, the information about the specific location may include a state of starting to select whether to set a disturbance interruption mode or to release the disturbance interruption mode.

The AI system determines that the surrounding environment is a specific location (S917), and if the surrounding environment is a specific location, the AI system may set a disturbance interruption mode (S919). If the surrounding environment is a specific location, the AI system may be set a normal mode to a disturbance interruption mode (S919) and control to pause an operation of the intelligent electronic device while being located in the specific location.

Further, the AI system may transmit information (or a signal) related to the disturbance interruption mode to the intelligent electronic device 100 (S930).

The intelligent electronic device 100 may transmit only sensing information to a 5G network, and extract a feature value corresponding to a location detection input to be used as an input of an artificial neural network for determining a specific location from sensing information in an AI system included in the 5G network.

Figure 12:
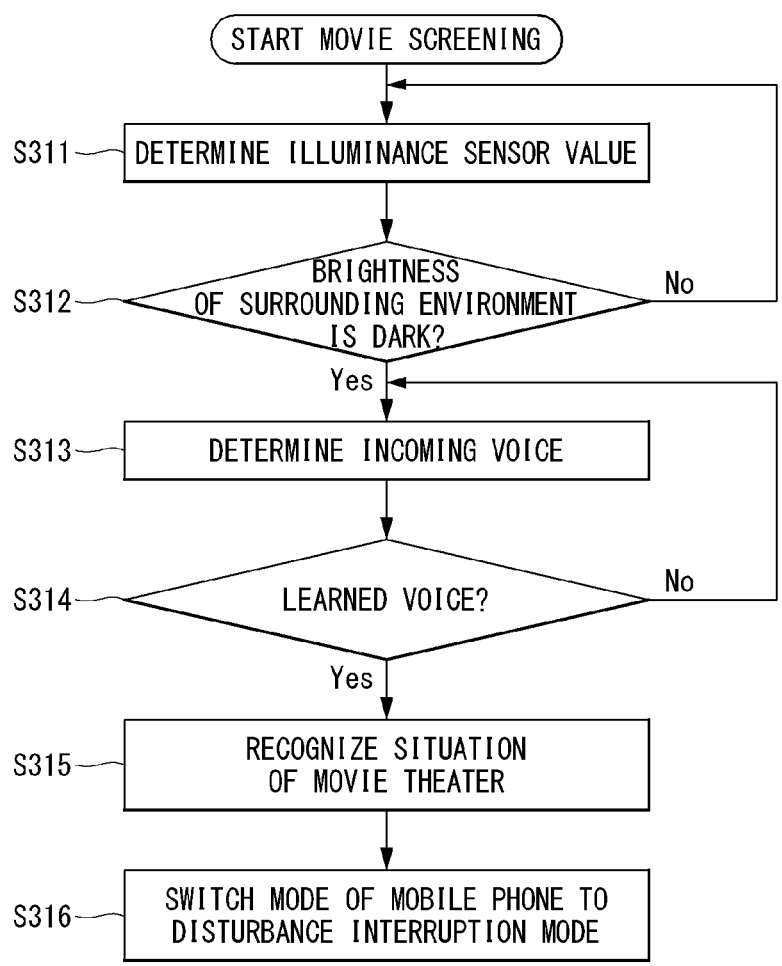
FIG. 12 illustrates an example of a mode setting method of an intelligent electronic device according to an embodiment of the present disclosure.

FIG. 12 illustrates an example of a mode setting method of an intelligent electronic device according to an embodiment of the present disclosure.

Referring to FIG. 12, the intelligent electronic device of the present disclosure may detect a current position through sensing information sensed by at least one sensor. For example, the intelligent electronic device may recognize a user's current position through a plurality of sensing information sensed by a GPS sensor or a gyro sensor. Here, the intelligent electronic device may sense and analyze a WiFi signal of a movie theater using communication sensors and leant based on the analyzed result, thereby recognizing that the current position is a movie theater, which is a specific location.

Thereafter, the intelligent electronic device may sense brightness of a surrounding environment using an illuminance sensor (S311). The intelligent electronic device determines that brightness of the sensed surrounding environment is not dark (S312), and if brightness of the sensed surrounding environment is not dark, the intelligent electronic device may continue to sense brightness of the surrounding environment at regular time intervals.

If the brightness of the sensed surrounding environment is dark, the intelligent electronic device may infer or estimate that screening of the movie has started at the movie theater, and activate a sensor other than the illuminance sensor.

The intelligent electronic device may sense a sound or a voice of the surrounding environment using the sound sensor (S313). The intelligent electronic device may compare and analyze whether the sensed sound or voice is a previously stored or learned sound or voice (S314). For example, the intelligent electronic device may store or learn a sensing sound such as a movie maker's opening music, movie opening music, an opening voice, an opening sound, or the like.

The intelligent electronic device may receive opening music related to the movie from an external device, extract feature values from the opening music, input the extracted feature values to an artificial neural network (ANN) trained to distinguish whether the extracted feature values are opening music related to the movie, analyze an output value of the artificial neural network, and determine opening music related to the movie based on the artificial neural network output value.

That is, the intelligent electronic device may combine and analyze position information, learned opening music related to the movie to recognize or determine a surrounding situation that the user is currently positioned in the movie theater and the movie is being played (S315).

If the surrounding situation is a movie theater, the intelligent electronic device may set a disturbance interruption mode and switch or change all defaults thereof to correspond to the set disturbance interruption mode (S316).

As described above, by accurately recognizing the surrounding situation, the intelligent electronic device can automatically set a preset normal mode to the disturbance interruption mode.

Figure 13:
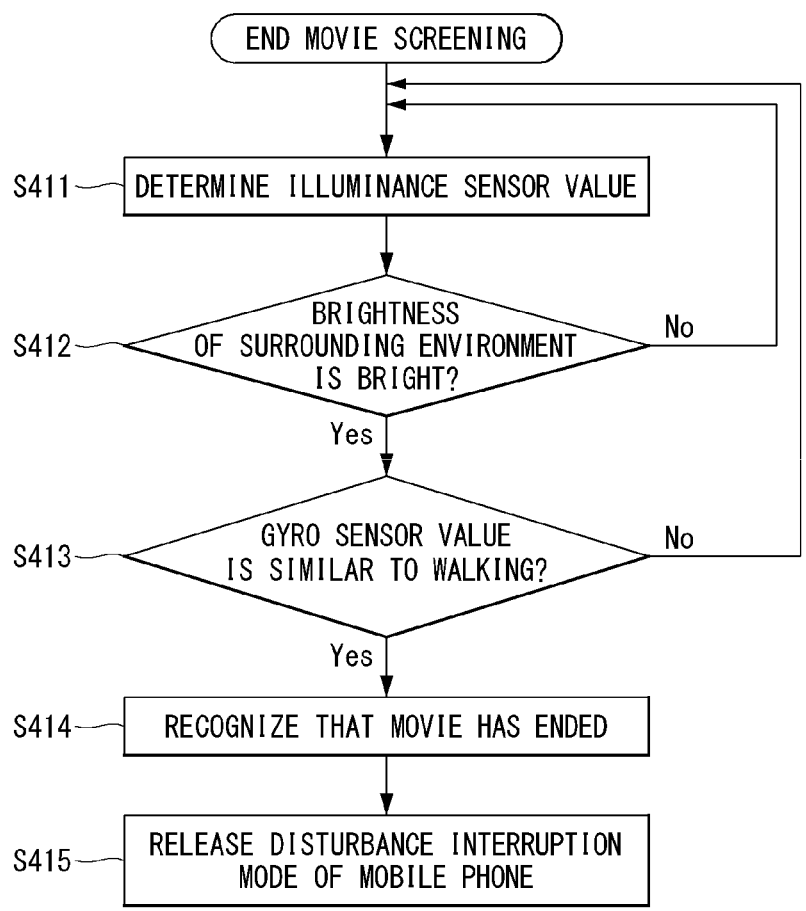
FIG. 13 illustrates another example of a mode setting method of an intelligent electronic device according to an embodiment of the present disclosure.

FIG. 13 illustrates another example of a mode setting method of an intelligent electronic device according to an embodiment of the present disclosure.

Referring to FIG. 13, if a movie is being played, the intelligent electronic device according to an embodiment of the present disclosure may continue to sense brightness of a surrounding environment using an illuminance sensor and continue to sense a sound of a surrounding environment using a sound sensor (S411).

For example, if brightness of the sensed surrounding environment is dark, the intelligent electronic device may continue to sense brightness of the surrounding environment at regular time intervals.

If brightness of the detected surrounding environment is bright (S412), the intelligent electronic device may infer or estimate that screening of the movie is ended in the movie theater, and activate a sensor other than the illuminance sensor.

The intelligent electronic device may detect a current position through sensing information sensed by at least one sensor (S413). For example, the intelligent electronic device may recognize the user's current position through a plurality of sensing information sensed by a GPS sensor or a gyro sensor. By sensing and analyzing a WiFi signal of the movie theater using communication sensors and learning based on the analyzed result, the intelligent electronic device may recognize that the user is near the movie theater.

Alternatively, when the user moves at a constant speed, when the user continues to move out of a preset range, or when the detected WiFi signal of the movie theater is gradually weakened, the intelligent electronic device may analyze this and learn based on the analyzed result, thereby recognizing that the user is currently moving from the movie theater to another position (S414). That is, the intelligent electronic device may recognize that the movie has ended.

When it is determined that the user is out of the movie theater, the intelligent electronic device may release a preset disturbance interruption mode and switch or change all defaults thereof to correspond to the released disturbance interruption mode (S415).

As described above, by accurately recognizing the surrounding situation, the intelligent electronic device can release the preset disturbance interruption mode and automatically switch to a normal mode.

As described above, the intelligent electronic device according to an embodiment of the present disclosure may analyze and learn a surrounding situation using information sensed by a plurality of sensors, recognize a specific location based on the learned result, and set or release a disturbance interruption mode to correspond to the recognized specific location or other locations. Accordingly, the intelligent electronic device may determine an etiquette environment appropriate to a surrounding environment to set a mode, thereby improving user convenience.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of setting a mode of an intelligent electronic device, the method comprising:
   collecting sensing information through a plurality of sensors in the intelligent electronic device;
   obtaining surrounding situation information based on the sensing information;
   extracting a feature value from the surrounding situation information;
   determining a surrounding environment of the intelligent electronic device based on the feature value;
   setting the intelligent electronic device in a disturbance interruption mode based on the surrounding environment,
   wherein the plurality of sensors include at least one sensor of an audio sensor, a location sensor, or an illuminance sensor,
   wherein the sensing information includes at least one of audio information, location information, or illuminance information,
   wherein the illumination sensor senses an ambient brightness of the intelligent electronic device at intervals of a predetermined time, and
   wherein the determining the surrounding environment comprises:

extracting a plurality of feature values from the audio information obtained through the at least one sensor;

inputting the plurality of feature values to an artificial neural network (ANN) classifier trained to distinguish whether the surrounding environment is a specific location; and determining the specific location from an output of the ANN classifier.

2. The method of claim 1, wherein the disturbance interruption mode controls at least one of a sound related setting for the intelligent electronic device, a screen brightness related setting for the intelligent electronic device, a vibration related setting for the intelligent electronic device, or a screen motion related setting for the intelligent electronic device.

3. The method of claim 2, wherein the collecting the sensing information includes:

randomly or periodically sensing at least one of ambient brightness to collect illumination information, ambient sound to collect sound information, or a moving distance of the intelligent electronic device to collect moving distance information.

4. The method of claim 1, further comprising turning on the disturbance interruption mode when a movie starts.

5. The method of claim 1, wherein the determining the surrounding environment further includes:

storing the surrounding situation information in a memory of the intelligent electronic device.

6. The method of claim 1, further comprising:

receiving, from a network, downlink control information (DCI) for scheduling transmission of the sensing information obtained by the plurality of sensors; and transmitting the sensing information to the network based on the DCI.

7. The method of claim 6, further comprising:

performing an initial access procedure with the network based on a synchronization signal block (SSB), wherein the sensing information is transmitted to the network through a Physical Uplink Shared Channel (PUSCH), and wherein a demodulation reference signal (DM-RS) of the SSB and the PUSCH is quasi co-located (QCL) for QCL kind D.

8. The method of claim 6, further comprising:

controlling a transceiver to transmit the sensing information to an artificial intelligence (AI) processor included in the network; and controlling the transceiver to receive AI processed information from the AI processor, wherein the AI processed information includes information indicating whether the surrounding environment is a specific location.

9. The method of claim 1, further comprising:

changing the disturbance interruption mode set for the intelligent electronic device based on the intelligent electronic device moving a distance away from a specific location.

10. An intelligent electronic device, comprising:

a plurality of sensors for sensing information; and a processor configured to:

obtain surrounding situation information based on the sensing information for determining a surrounding environment of the intelligent electronic device, and set the intelligent electronic device in a disturbance interruption mode based on the surrounding environment, wherein the plurality of sensors include at least one sensor of an audio sensor, a location sensor, or an illuminance sensor, wherein the sensing information includes at least one of audio information, location information, or illuminance information, wherein the processor is further configured to:

extract a plurality of feature values from the sensing information obtained through the at least one sensor, input the plurality of feature values to an artificial neural network (ANN) classifier trained to distinguish whether the surrounding environment is a specific location, and set the intelligent electronic device in the disturbance interruption mode based on the specific location, wherein the illumination sensor senses an ambient brightness of the intelligent electronic device at intervals of a predetermined time.

11. The intelligent electronic device of claim 10, wherein the disturbance interruption mode controls at least one of a sound related setting for the intelligent electronic device, a screen brightness related setting for the intelligent electronic device, a vibration related setting for the intelligent electronic device, or a screen motion related setting for the intelligent electronic device.

12. The intelligent electronic device of claim 10, wherein the disturbance interruption mode is turned on when a movie starts.

13. The intelligent electronic device of claim 10, wherein the processor is further configured to:

store the surrounding situation information in a memory of the intelligent electronic device.

14. The intelligent electronic device of claim 10, further comprising:

a transceiver configured to communicate with a network, wherein the processor is further configured to:

transmit, via the transceiver, the sensing information to an artificial intelligence (AI) processor included in the network for determining whether the surrounding environment is a specific location based on the sensing information, receive, via the transceiver, result information corresponding to an output of the AI processor, and set the intelligent electronic device in the disturbance interruption mode based on the result information.

15. The intelligent electronic device of claim 10, wherein the processor is further configured to:

randomly or periodically sense, via at least one of the plurality of sensors, at least one of ambient brightness to collect illumination information, ambient sound to collect sound information, or a moving distance of the intelligent electronic device to collect moving distance information.

16. The intelligent electronic device of claim 10, further comprising:

a transceiver configured to communicate with a network, wherein the processor is further configured to:

receive, via the transceiver, downlink control information (DCI) from the network for scheduling transmission of the sensing information obtained by the plurality of sensors, and transmit, via the transceiver, the sensing information to the network based on the DCI.

17. The intelligent electronic device of claim 16, wherein the processor is further configured to:

perform an initial access procedure with the network based on a synchronization signal block (SSB) through the transceiver, wherein the sensing information is transmitted to the network through a Physical Uplink Shared Channel (PUSCH), and wherein a demodulation reference signal (DM-RS) of the SSB and the PUSCH is quasi co-located (QCL) for QCL kind D.

18. The intelligent electronic device of claim 16, wherein the processor is further configured to:

transmit, via the transceiver, the sensing information to an artificial intelligence (AI) processor included in the network through the transceiver, and receive, via the transceiver, AI processed information from the AI processor, wherein the AI processed information includes information indicating whether the surrounding environment is a specific location.

19. The intelligent electronic device of claim 10, wherein the processor is further configured to:

change the disturbance interruption mode set for the intelligent electronic device based on the intelligent electronic device moving a distance away from a specific location.

20. A method of setting a disturbance interruption mode of an electronic device, the method comprising:

collecting, by at least one sensor of the electronic device, sensing information;

determining, by a processor of the electronic device, a surrounding environment of the electronic device based on the sensing information; and setting the electronic device in a disturbance interruption mode based on the surrounding environment without receiving a user input for setting the disturbance interruption mode, wherein the at least one sensor includes an audio sensor, a location sensor, or an illuminance sensor, wherein the sensing information includes at least one of audio information, location information, or illuminance information, wherein the illumination sensor senses an ambient brightness of the intelligent electronic device at intervals of a predetermined time, wherein the determining the surrounding environment comprises:

extracting a plurality of feature values from the audio information obtained through the at least one sensor;

inputting the plurality of feature values to an artificial neural network (ANN) classifier trained to distinguish whether the surrounding environment is a specific location; and determining the specific location from an output of the ANN classifier.

* * * * *